United States Patent [19]

Baba et al.

[11] Patent Number: 4,620,222
[45] Date of Patent: Oct. 28, 1986

[54] DIGITAL COLOR TV CAMERA

[75] Inventors: Takaaki Baba, Kounan, Japan; Gerald T. O'Keefe, Cupertino, Calif.

[73] Assignee: Matsushita Electric Industrial Co., Ltd., Kadoma, Japan

[21] Appl. No.: 549,812

[22] Filed: Nov. 8, 1983

[30] Foreign Application Priority Data

Nov. 10, 1982 [JP] Japan ................... 57-196985
Nov. 12, 1982 [JP] Japan ................... 57-199190

[51] Int. Cl.⁴ .................... H04N 9/077; H04N 9/07
[52] U.S. Cl. ............................. 358/48; 358/44
[58] Field of Search ............ 358/41, 43, 44, 39, 358/40, 48

[56] References Cited

U.S. PATENT DOCUMENTS 4,467,347  8/1984  Ozawa et al. ............... 358/48
4,490,738 12/1984  Asaida ........................ 358/41

FOREIGN PATENT DOCUMENTS 0057923  8/1982  European Pat. Off. ........ 358/44
109488   7/1982  Japan ......................... 358/44

*Primary Examiner*—James J. Groody
*Assistant Examiner*—Randall S. Svihla
*Attorney, Agent, or Firm*—Wenderoth, Lind & Ponack

[57] ABSTRACT

A digital color TV camera includes an image sensor for receiving optical signals so as to produce two alternately different pixel signals and an analog to digital converter for receiving the two alternately different signals so as to produce a multiplexed digital pixel signal. The camera also includes a digital chrominance signal processor for receiving the multiplexed digital pixel signal so as to produce two independent digital chrominance difference signals and the camera further includes a digital luminance signal processor for receiving the multiplexed digital pixel signal to produce a digital luminance signal. The color TV camera further includes a color television signal encoder for receiving the two independent digital chrominance difference signals and the digital luminance signals so as to produce a color television signal and a control circuit for generating sets of timing pulses for controlling the A/D converter and chrominance signal processor and luminance signal processor in addition to including a driver for driving the image sensor and color television signal encoder and control circuit.

18 Claims, 24 Drawing Figures

DIGITAL COLOR TV CAMERA

BACKGROUND OF THE INVENTION

1. Field of the Invention

This invention relates to a color camera that is used in the field of TV-studio camera systems, consumer VTR-camera systems, surveillance camera systems and object-detective camera systems.

2. Description of the Prior Art

Within recent several years a demand for consumer-used VTRs has become vast. In accordance with this movement, developments of color cameras has become active and a final goal of this development is to realize a color camera system which is very small sized, easy to use and low in power consumption.

The conventional method to realize signal process parts of the color camera is mainly based on analog signal processing, so that the color camera using this conventional technique has the following disadvantages:

(A) Analog signals which are converted signals of optical-image signal are processed by passing several analog signal process circuits, so an absolute signal to noise ratio (S/N) of the processed analog signals decays as the signal propagate from one process circuit to the next process circuit. For the correction of the S/N decay, very complicated analog circuits and many adjustments thereof are needed. This complication increases the unstability and power consumption rate of the color camera system.

(B) The conventional color camera using color tube and analog circuits has several ten adjustment-points on the production line. This makes it difficult to manufacture the color camera system at a low cost.

(C) The conventional color camera using analog circuits includes so many extra circuit-components to realize an auto-white balanced color correction and auto gamma correction of luminance and chrominance signals.

(D) The conventional color camera using analog circuits require one horizontal delay line as a basic function of the circuits. This delay line is composed of inductance-coils, capacitors, registors and some transistors. This means that it is impossible to fabricate the delay line and the other analog ICs into a monolithic IC chip.

As a summary of the above reasons the conventional design methods using analog signal processing have their own limit in ability of realizing a color camera with very small sized IC circuits, very low power consumption, easy way of use and very simple way of production.

SUMMARY OF THE INVENTION

It is a principal object of this invention to provide a color camera using digital circuits for its signal process parts and to simplify the process parts into digital integrated circuit, wherein the process parts are composed of chrominance signal process part, luminance signal process part and digital control parts.

It is another object of this invention to reduce adjustment points on the signal process parts of a color camera by using digital control methods.

It is still another object of this invention to simplify the analog to digital converting means of a color camera.

It is a further object of this invention to provide a novel encoding means for receiving processed digital signals to produce color television signal-output of a color camera. These objectives are achieved according to this invention by providing a color camera comprising: Image sensing means for receiving optical signals to produce two alternately different pixel signals—a first pixel signal and a second pixel signal—, the first pixel signal being composed of repeated combination of two different color pixel informations which are shifted out with a repetition frequency of $f_c$ in a horizontal synchronous interval of television signal, and the second picture-pixel signal being composed of repeated combination of next two different color pixel informations which are different from said two different color pixel informations and are shifted out with a repetition frequency of $f_c$ in the next coming horizontal synchronous interval of the television signal; analog to digital converting means for receiving said two alternately different pixel signals to produce a multiplexed digital pixel signal; digital chrominance signal processing means for receiving said multiplexed digital pixel signal to produce two independent digital chrominance-difference signals; digital luminance signal processing means for receiving said multiplexed digital pixel signal to produce digital luminance signal; color television signal encoding means for receiving said two independent digital chrominance-difference signals and said digital luminance signal to produce color television signal; and driving means for coupling said image sensing means, wherein said A/D converting means, said digital chrominance signal processing means, said digital luminance signal processing means and said color television signal encoding means are respectively controlled by first, second, third, fourth timing pulse systems which are generated in accordance with the timing of said driving means. Thus the most basic signal process parts for a color camera, that is, chrominance and luminance signal process parts are realized by a fully digitalized circuit components.

BRIEF DESCRIPTION OF THE DRAWINGS

The above and other objects, features and advantages of this invention will be apparent from consideration of the following description taken in connection with the accompanying drawings in which.

DESCRIPTION OF THE PREFERRED EMBODIMENTS

Figure 1:
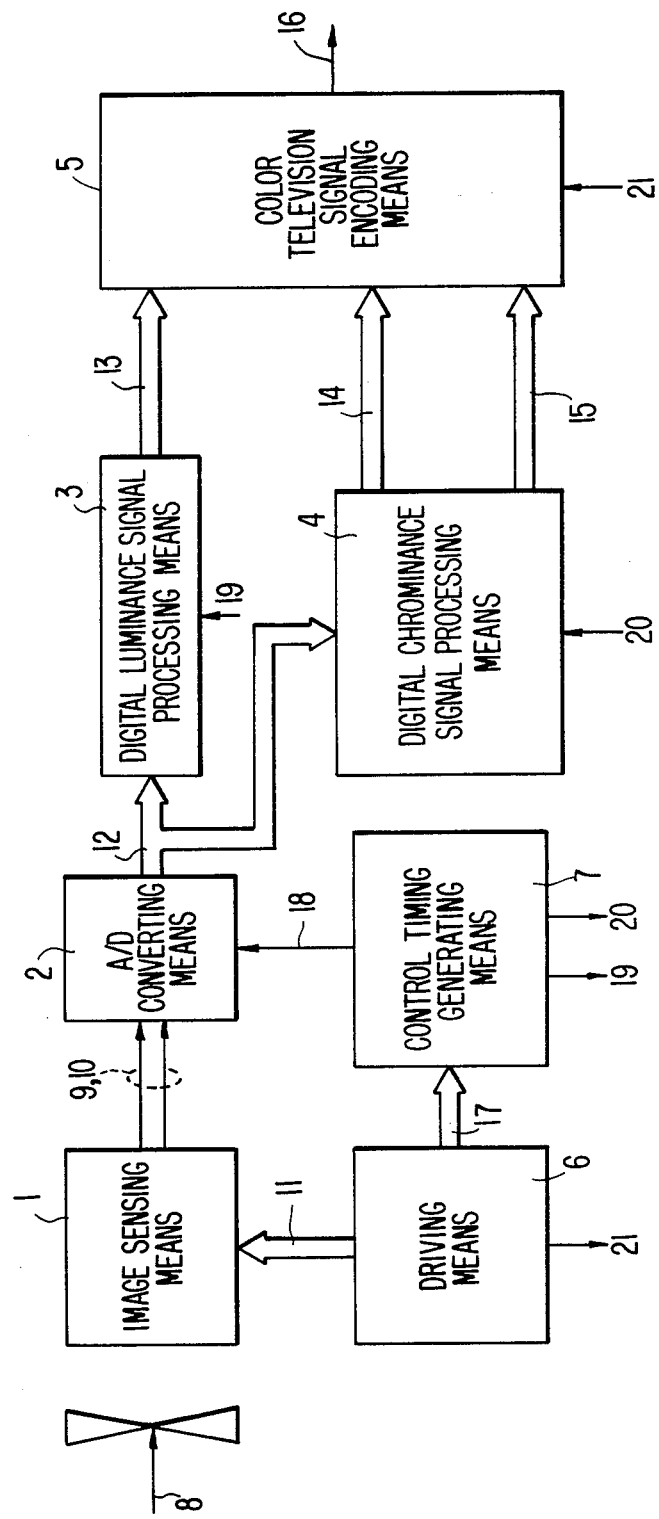
FIG. 1 is a basic block diagram of a color camera, showing a configuration of this invention.

FIG. 1 is a basic block diagram of a color camera, showing a configuration of this invention, in which: an image sensing means 1 is connected to an A/D converting means 2; the A/D converting means 2 is connected to a digital chrominance signal processing means 4 and a digital luminance signal processing means 3; the digital chrominance signal processing means 4 and the digital luminance signal processing means 3 are connected to a color television signal encoding means 5; and a driving means 6 is coupled to the image sensing means 1 and a control timing generating means 7.

The detailed operation of each means 1, 2, 3, 4, 5, 6, 7 will now be described. With receiving optical image signals 8, the image sensing means produces two alternately different kinds of pixel signals—a first pixel signal 9 and a second pixel signal 10. The first pixel signal 9 is composed of two different color pixel signals which are shifted out alternately at a repetition frequency of $f_c$ in one of two adjacent horizontal synchronous intervals of a television signal. The second pixel signal 10 is composed of other two different color pixel signals which are different from the two color pixel signals of the first pixel signal 9 and are shifted out alternately at a repetition frequency of $f_c$ in the other of the two adjacent horizontal synchronous intervals of the television signal.

The above described operation of the image sensing means is controlled by control signals 11 supplied from the driving means 6. The pixel signals 9, 10 are analog signals or analog sampled signals. The pixel signals 9, 10 are converted to a digital pixel signal 12 by passing the A/D converting means 2. The digital pixel signal 12 is fed to the digital chrominance signal processing means 4. This processing means 4 produces a set of two independent digital chrominance difference signals 14, 15. The digital pixel signal 12 is also fed to the digital luminance signal process means 3. This process means 3 produces digital luminance signal 13. The digital luminance signal 13 and digital chrominance signals 14, 15 are fed to the color television signal encoding means 5. The encoding means 5 produces a standard color television signal 16 as an output. This standard television signal may be analog signal for some application like a compact color camera and may be digital signal for the other application like object-detective camera system. The A/D converting means 2, the digital luminance signal processing means 3, the digital chrominance signal processing means 4 and the color television encoding means 5 are respectively controlled by the first, second and third sets of timing pulses 18, 19 and 20 which are generated by the control timing generating means 7 in accordance with the set of timing pulses 17 generated by the driving means 6, and the fourth set of timing pulses 21 generated by the driving means 6.

As described above, the main signal processing means for a color camera is realized on a digital circuit system. This is one of the major advantages of this invention.

Figure 2:
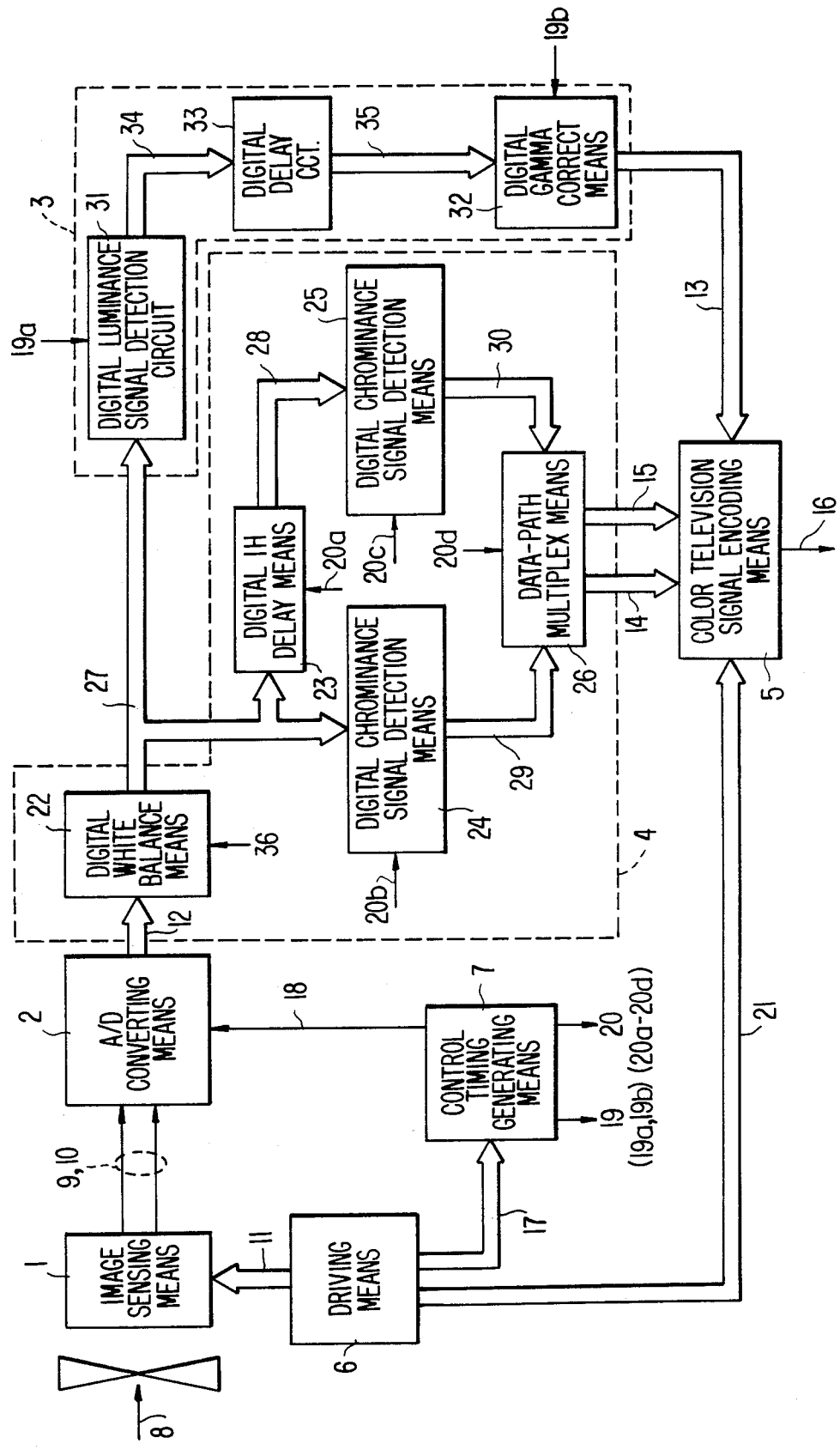
FIG. 2 is an example of the specific configuration of the invented color camera.

FIG. 2 is one example of the specific configuration of the invented color camera, in which detailed configurations for the digital chrominance signal means 4 and the digital luminance signal processing means 3 are disclosed. In FIG. 2, a digital one horizontal synchronous period delay means (hereinafter referred to as digital 1H delay means) 23, first digital chrominance signal detection means 24, second digital chrominance signal detection means 25, data-path multiplex means 26 and digital white balance means 22 are provided in the digital chrominance signal processing means 4. The digital pixel signal 12 is converted to a digital pixel signal 27 by passing the digital white balance means 22, in which said digital pixel signal 27 is a white balanced signal. The digital pixel signal 27 is converted to a digital pixel signal 28 by passing the digital 1H delay memory means 23, in which the digital pixel signal 27 is delayed by a period of one horizontal synchronous interval (1H). Therefore, in one horizontal synchronous interval, when the digital pixel signal 27 is composed of the information of the pixel signal 9, the digital pixel signal 28 is composed of the information of the pixel signal 10. In the next horizontal synchronous interval, the relations are reversed, that is, the digital pixel signal 27 is composed of the information of the pixel signal 10 and the digital pixel signal 28 is composed of the information of the pixel signal 9.

As will be described below, two different type of digital pixel signals 27, 28 are fundamental signals to produce first and second independent digital chrominance difference signals 14, 15. By passing a first digital chrominance signal detection means 24, the digital pixel signal 27 is converted to a digital chrominance difference signal 29, in which the information of the pixel signal 9 and the pixel signal 10 are rotated alternately in accordance with the repetition rate of horizontal synchronous interval. In the same manner, by passing a second digital chrominance signal detection means 25, the digital pixel signal 28 is converted to a digital chrominance difference signal 30, in which the information of the pixel signal 9 and the pixel signal 10 are also rotated alternately in accordance with the repetition rate of horizontal synchronous interval. In other words, the digital chrominance difference signal 30 is a delayed signal over the digital chrominance difference signal 29 by a period of one horizontal synchronous interval.

By selecting the digital chrominance difference signal 29 and the digital chrominance difference signal 30, data-path multiplex means 26 produces first and second independent digital chrominance difference signals 14, 15, in which the digital chrominance difference signal 14 is composed of the information of the first pixel signal 9 in each coming horizontal synchronous interval and the digital chrominance difference signal 15 is composed of the information of the second pixel signal 10 in each coming horizontal synchronous interval. The relation of the digital chrominance difference signals 14, 15 vs. the information of first and second pixel signals 9, 10 may be exchanged from the above defined relation.

Now it is clear that the digital chrominance signal processing means 4 comprises a digital 1H delay means 23, first and second digital chrominance signal detection means 24, 25 and a data-path multiplex means 26.

A digital luminance detection circuit 31, a digital gamma correction circuit 32 and a digital delay circuit 33 are provided in the digital luminance signal processing means 3. The digital pixel signal 27 is converted to a digital luminance signal 34 by passing the digital luminance detection circuit 31. The digital luminance signal 34 is converted to a delayed digital luminance signal 35 by passing the digital delay circuit 33. The delayed digital luminance signal 35 is then converted to a digital luminance signal 13 by passing the digital gamma correction circuits 32, in which the digital luminance signal 13 is a gamma corrected digital luminance signal over the digital luminance signals 35, 34.

It is the task of the delay circuit 33 to cancel out a relative output timing difference between the digital chrominance difference signals 14, 15 and the digital luminance signal 13. This sort of difference will depend on design-configurations of the digital chrominance signal processing means 4 and digital luminance signal processing means 3. So, in some case, the function of the digital delay circuit 33 may be provided in the digital chrominance signal processing means 4.

As described above, the basic circuit for the digital luminance signal processing means 3 comprises digital luminance signal detection circuit 31 and digital gamma correction circuit 32. Moreover, it is not impossible to take out the digital gamma correction circuit 32 from the digital luminance signal processing means 3, if the gamma-corrected pixel signal is supplied at the input end of the A/D converting means 2.

Figure 3:
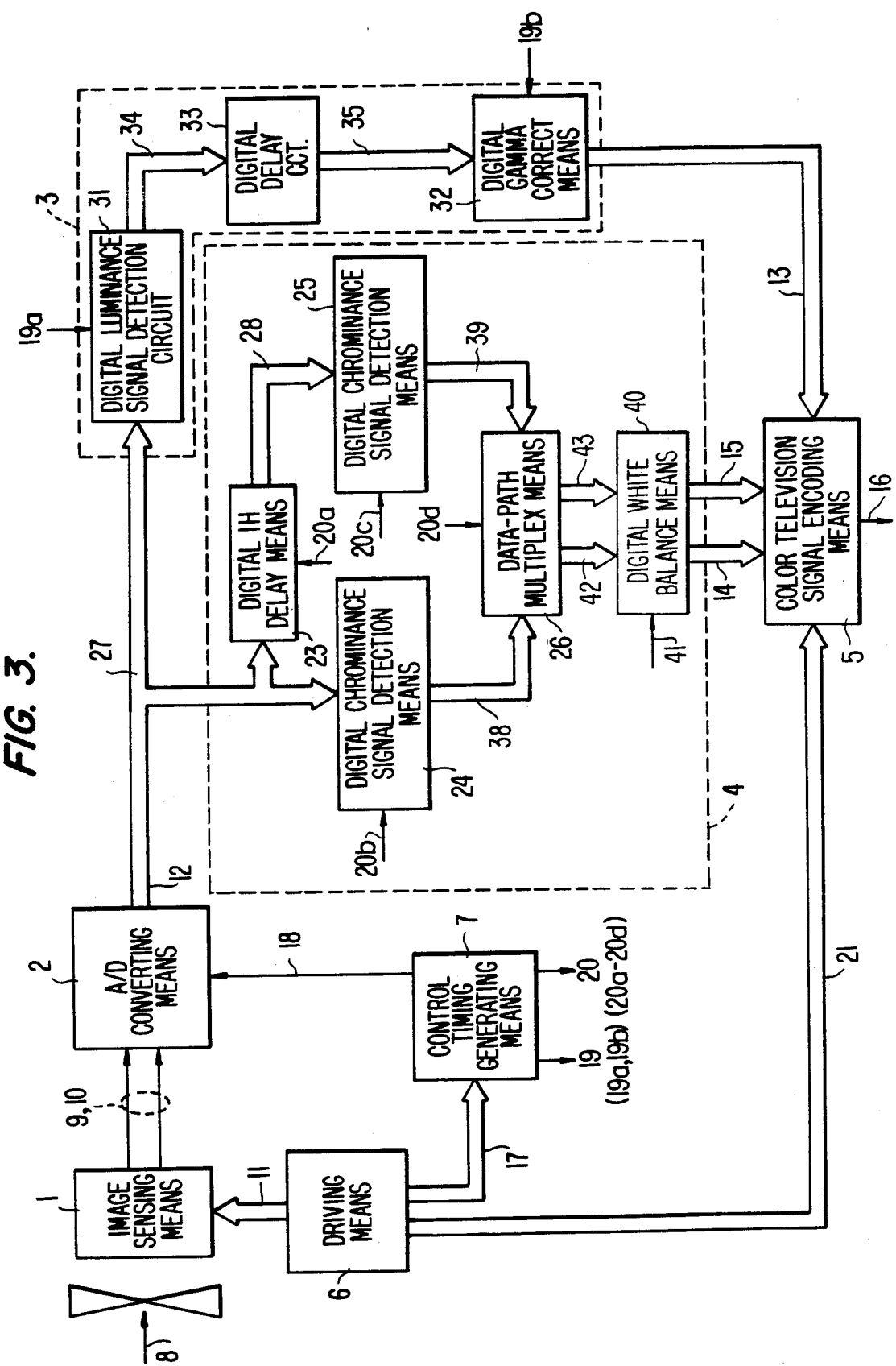
FIG. 3 is another example of the specific configuration of the invented color camera.

FIG. 3 is another example of the specific configuration of the invented color camera, in which another detailed configuration for the digital chrominance signal processing means 4 is disclosed. Therefore, in FIG. 3 the configuration of the invented color camera is basically same as the configuration shown in FIG. 2 except the configuration for the digital chrominance signal processing means 4. In FIG. 3, a digital 1H delay means 23, first digital chrominance signal detection means 24, second digital chrominance signal detection means 25, data-path multiplex means 26 and digital white balance means 40 are provided in the digital chrominance signal processing means 4. The digital white balance means 40 is placed at the output end of the data-path multiplex means 26. So, digital pixel signal 37, digital chrominance difference signal 38, digital chrominance difference signal 39, digital chrominance difference signal 42 and digital chrominance difference signal 43 are respectively same as the digital pixel signal 28, the digital chrominance difference signal 29, the digital chrominance difference signals 30, the digital chrominance difference signal 14 and the digital chrominance difference signal 15 except that those signals 37, 38, 39, 42 and 43 are not white balanced signals. The data-path multiplex means 26 produces the digital chrominance difference signals 42, 43, in which the digital chrominance difference signal 42 is composed of the information of the first pixel signal 9 in each horizontal synchronous interval and the digital chrominance difference signal 43 is composed of the information of the second pixel signal 10 in each horizontal synchronous interval. The digital chrominance difference signal 42 and the digital chrominance difference signal 43 are respectively converted to the chrominance difference signal 14 and the chrominance difference signal 15 by passing the digital white balance means 40.

Now it is clear that another example of the invented color camera are realized as shown in FIG. 3.

Figure 4:
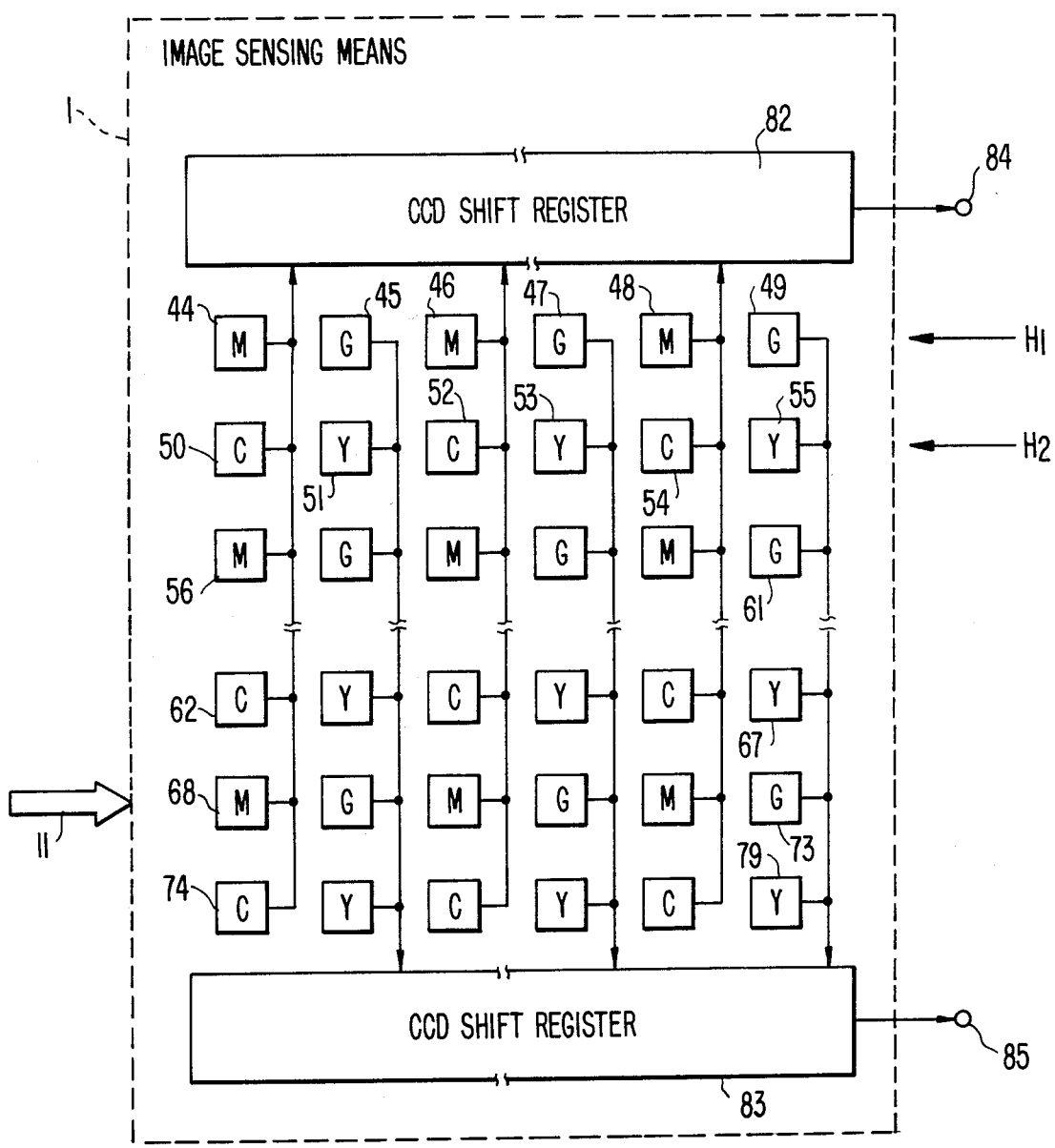
FIG. 4 is an example of an image sensing means used to explain the effect of this invention.

FIG. 4 is one example of the image sensing means 1, in which a combination of magenta (M), green (G), cyan (C) and yellow (Y) color filters are placed on MOS structured photodiodes which make an array of pixel elements 44-79. In FIG. 4, the array is simplified one. Actually the array is consisted of several hundred of pixel elements in both horizontal and vertical directions. At a start-timing of a horizontal synchronous interval $H_1$, when a first row of pixel elements 44-49 is selected, the M pixel signals generated underneath the elements 44, 46, 48 are simultaneously transferred into a CCD (charge coupled device) shift register 82, and the G pixel signals generated underneath the elements 45, 47, 49 are simultaneously transferred into a CCD shift register 83. Then these groups of M pixel signals and G pixel signals are respectively swept out through a terminal 84 and a terminal 85 during the period of the horizontal synchronous interval $H_1$ at a repetition rate of $1/f_c$. For next coming horizontal synchronous interval $H_2$, as a second row of pixel elements 50-55 are selected, the C pixel signals generated underneath the elements 50, 52, 54 are simultaneously transferred into the CCD shift register 82, and the Y pixel signal generated underneath the elements 51, 53, 55 are also simultaneously transferred into the CCD shift register 83. Then these groups of C pixel signals and Y pixel signals are respectively swept out through the terminal 84 and the terminal 85 during the period of the horizontal synchronous interval $H_2$ at a repetition rate of $1/f_c$. In the same manner as discussed above, in each comming horizontal synchronous interval, groups of pixel elements 56-61, pixel elements 62-67, pixel elements 68-73, and pixel elements 74-79 are selected. So, combinations of M and G pixel signals or C and Y pixel signals are swept out through the terminals 84 and 85. These sort of repeated operations make a content of one field interval scanning for TV signals. In one case, a couple of repetitions of this one field interval scanning make a content of one frame interval scanning for TV signals. In another case, an interlaced scanning is performed by changing selection way of pixel elements along the row lines on the image sensing means 1. The above sort of operations on the image sensing means 1 are performed by the aid of control signals 11.

As the conclusion of the above descriptions on the image sensing means 1, it is clear that the M and G pixel signals are respectively produced through the terminals 84 and 85 during the period of horizontal synchronous interval $H_1$, and the C and Y pixel signals are respectively produced through the terminals 84 and 85 during the period of horizontal synchronous interval $H_2$. The above two different modes of outputs are repeated alternately, and the first CCD shift register 82 and the second CCD shift register 83 are operated at a frequency of $f_c$ with clock signals which are inverted in phase from each other. In this way, the image sensing means 1 produces a stream of first kind of pixel signal 9 with information of M and G pixel signals in a horizontal synchronous interval $H_1$ and produces a stream of second kind of pixel signal 10 with information of C and Y pixel signals in a next horizontal synchronous interval $H_2$.

Figure 5:
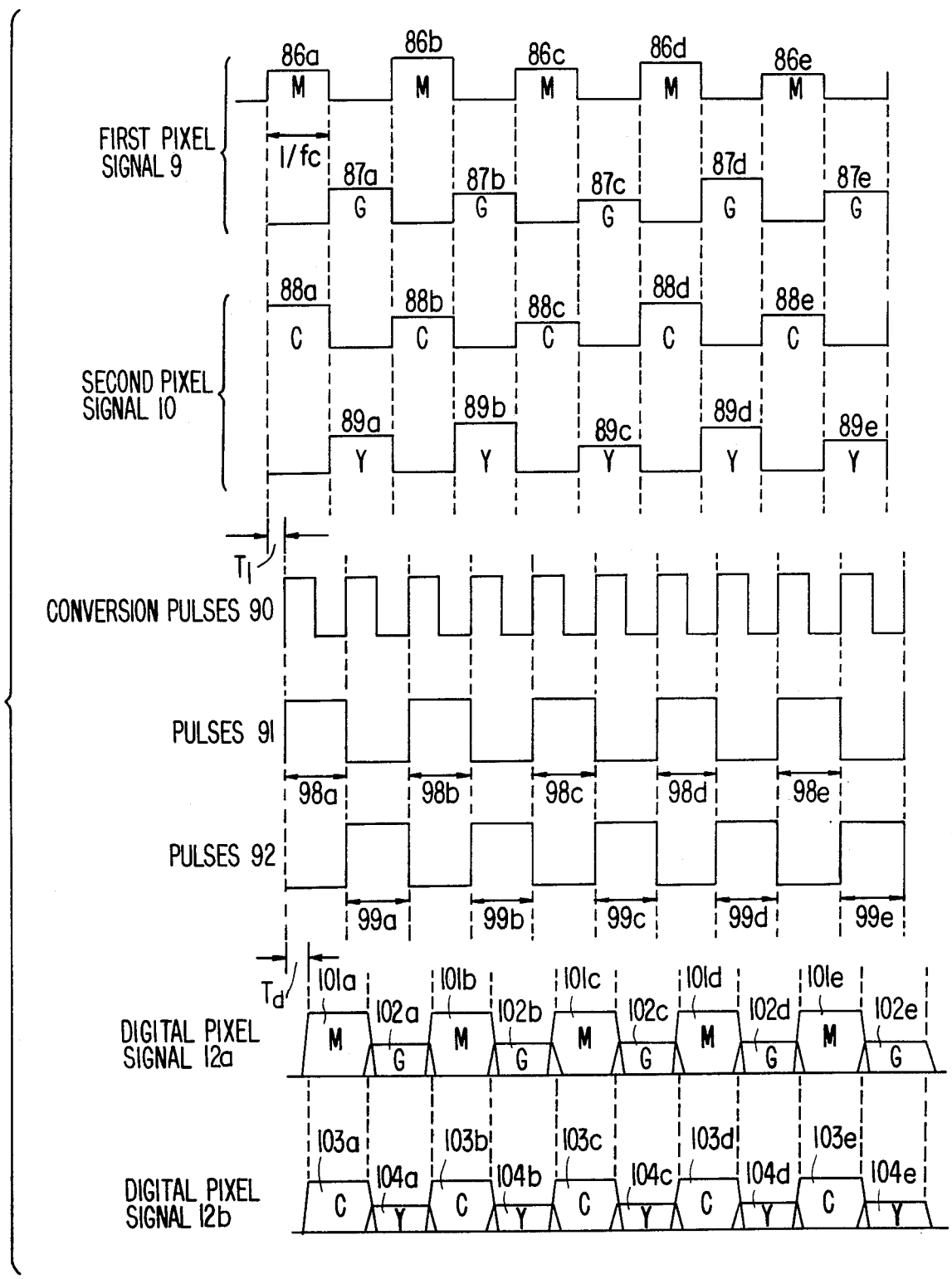
FIG. 5 shows output wave forms generated by the image sensing means and also shows wave forms of A/D converted signals and drive-timing pulses.

FIG. 5 shows analog-sampled waveforms of the first kind of pixel signal 9 and second kind of pixel signal 10 generated by the image sensing means 1, and also shows digital pixel signals 12a, 12b which are converted signals from the pixel signals 9, 10 by the aid of the A/D converting means 2. Timing pulses for operating the A/D converting means 2 are also shown in FIG. 5. It is necessary for conversion pulses 90 and pulses 91 and 92 to be delayed by $T_1$ with respect to analog pixel signals 9 and 10 so that analog pixel signals 9 and 10 will be converted correctly to digital pixel signals 12a and 12b.

In the case of the image sensing means 1 shown in FIG. 4 as an example, the image sensing means 1 produces two kinds of pixel signals through the terminals 84, 85 in a horizontal synchronous interval $H_1$ to $H_2$. So, it is necessary to mix-up the two kinds of pixel signals into a stream of pixel signals.

Figure 6A:
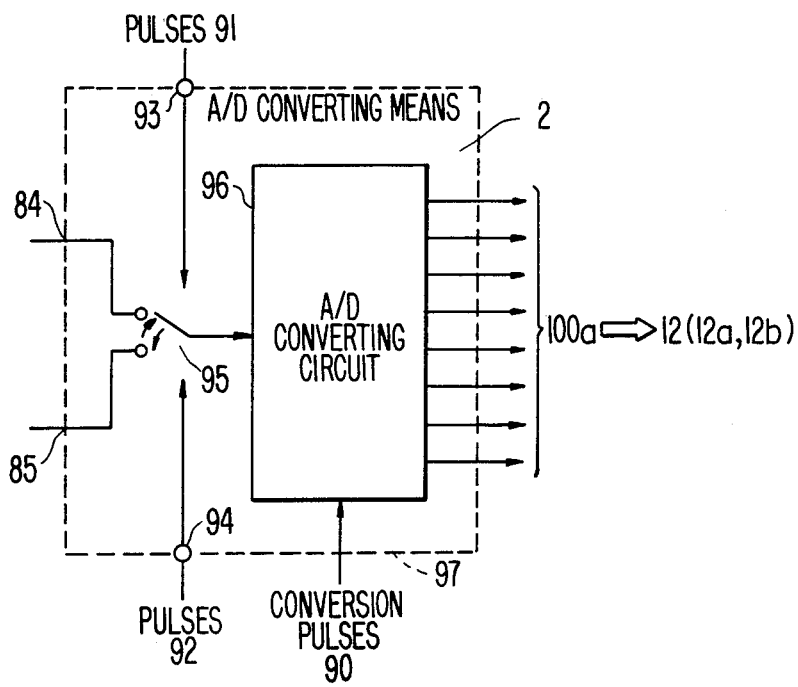
FIGS. 6(a), (b) are examples of the A/D converting means.
Figure 6B:
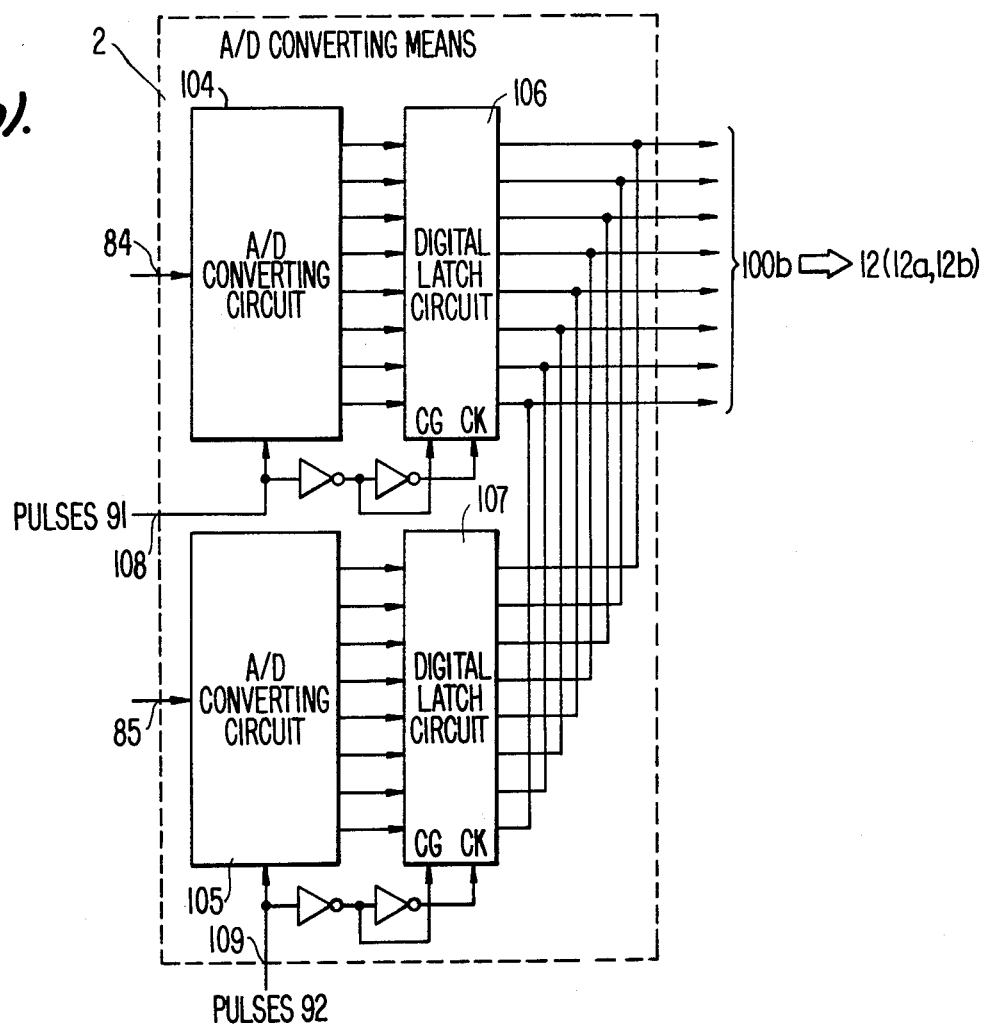

To accomplish the above task, two different examples of the A/D converter means will be disclosed as shown in FIG. 6(a) and FIG. 6(b).

In FIG. 6(a), an analog to digital (A/D) conversion circuit 96 and an analog switch circuit 95 are provided in the A/D converting means 2. In a horizontal synchronous interval $H_1$, the image sensing means 1 produces the first pixel signal 9 having a stream of M pixel signals 86a-8e through the terminal 84 and having a stream of G picture pixel signals 87a-87e through the terminal 85. During each timing intervals 98a-98e, with receiving a stream of pulses 91 through the terminal 93 the analog switch circuit 95 selects the stream of M pixel signals 86a-86e as input signals for the A/D conversion circuit 96. Then, the A/D conversion circuit 96 converts the stream of M pixel signals into digital M pixel signals 101a-101e by receiving a stream of conversion pulses 90 through the terminal 97. During each timing intervals 99a-99e, with receiving a stream of pulses 92 through the terminal 94 the analog switch circuit 95 selects a stream of G pixel signals 87a-87e as input signals for the A/D conversion circuit 96. Then, the A/D conversion circuit 96 converts the stream of G pixel signals 87a-87e into G pixel signals 102a-102e by receiving the stream of conversion pulses 90 through the terminal 97. In this way, the analog switch circuit 95 multiplexes two streams of pixel signals M and G in this case, at a repetition rate of $2/f_c$ and at the almost same time the A/D conversion circuit 96 is operated at a frequency of $f_c$. Therefore, analog informations of M and G pixel signals 86a-86e, 87a-87e are converted and produced as a stream of digital pixel signals 12a through the terminal 100a.

In next coming horizontal synchronous interval $H_2$, the image sensing means 1 produces second kind of pixel signals 10 having a stream of C pixel signals 88a-88e through the terminal 84 and having a stream of Y pixel signals 89a-89e through the terminal 85. By applying the same kind of operation principles to the analog switch circuit 95 and the A/D conversion circuit 96, it is apparent that analog informations of C and Y pixel signals 88a-88e, 89a-89e are converted and produced as a stream of digital pixel signals 12b (103a-103e, 104a-104e) through the terminal 100a.

As described above, now it is clear that the A/D converting means 2 comprises the analog switch circuit 95 and the A/D conversion circuit 96, in which the first set of timing pulses 18 shown in FIGS. 1, 2 and 3 correspond to the stream of conversion pulses 90.

FIG. 6(b) shows another example of the A/D converting means 2, in which: a first A/D conversion circuit 104 coupled to the image sensing means 1 through the terminal 84 for receiving first or second kind of pixel signals 9, 10 produces digital information of the pixel signal 9, 10; a second A/D conversion circuit 105 coupled to image sensing means 1 through the terminal 85 for receiving first or second kind of pixel signals 9, 10 produces also digital information of the pixel signals 9, 10; a first digital latch circuit 106 coupled to the first A/D conversion circuit 104 receives the digital informations, a second digital latch circuit 107 coupled to the second A/D converson circuit 105 receives also the digital informations. Outputs of the first and second latch circuits 106, 107 are coupled in common, respectively, and operating timings for the first A/D conversion circuit 104 and the first latch circuit 106 and for the second A/D conversion circuit 105 and the second latch circuit 107 are alternately phase shifted to produce digital pixel signals 12a, 12b. The detailed operations of the above configuration on the A/D converting means 2 will be described below for the purpose to clarity the features of this invention.

In a horizontal synchronous interval $H_1$, since the image sensing means 1 produces the first kind of analog pixel signal 9, the M pixel signals 86a-86e are generated through the terminal 84 and the G pixel signals 87a-87e are generated through the terminal 85. During each timing intervals 98a-98e, with receiving a stream of pulses 91 through the terminal 108, the first A/D conversion circuit 104 converts the stream of M pixel signals 86a-86e into a stream of digital pixel signals 101a-101e. Then the stream of digital picture-pixel signals 101a-101e are latched up by the first latch circuit 106 within a data latch-up time td in each of the timing intervals 98a-98e and are produced as output signals through the common terminal 100b. During the above timing intervals 98a-98e output terminals of the second latch circuit 107 are maintained open conditions. During each of the timing intervals 99a-99e, with receiving a stream of pulses 92 through the terminal 109, the second A/D conversion circuit 105 converts the stream of G pixel signals 87a-87e into a stream of digital pixel signals 102a-102e. Then the stream of the digital pixel signals 102a-102e are latched up by the second latch circuit 107 within the data latch-up time td in each of the timing intervals 99a-99e and are produced as output signals through the common terminal 100b. During the above timing intervals 99a-99e, output terminals of the first latch circuits 106 are maintained open conditions.

Thus, the first digital latch circuit 106 and the second digital circuit 107 are operated alternately at a repetition rate of $2/f_c$ and output terminals of these latches 106, 107 are respectively connected in common. Therefore, these operating conditions make it possible to mix-up two streams of M pixel signals 86a–86e and G pixel signal 87a–87e and to convert into digital pixel signal 12a produced through the common terminal 100b.

In the next coming horizontal interval $H_2$, since the image sensing means produces the second kind of analog pixel signal 10 having the C pixel signals 88a–88e and the Y pixel signals 89a–89e. By applying the same kind of operation principle to the A/D conversion circuits 104, 105 and the digital latch circuits 106, 107, it is possible to mix-up two streams of C pixel signals 88a–88e and Y pixel signals 89a–89e and to convert into digital pixel signal 12b produced through the common terminal 100b.

As described above, it is apparent that the A/D converting means 2 comprises the first and second A/D conversion circuits 104, 105 and the first and second digital latch circuits 106, 107, in which the first set of timing pulses 18 shown in FIGS. 1, 2 and 3 correspond to the stream of pulses 91 and 92.

Figure 7:
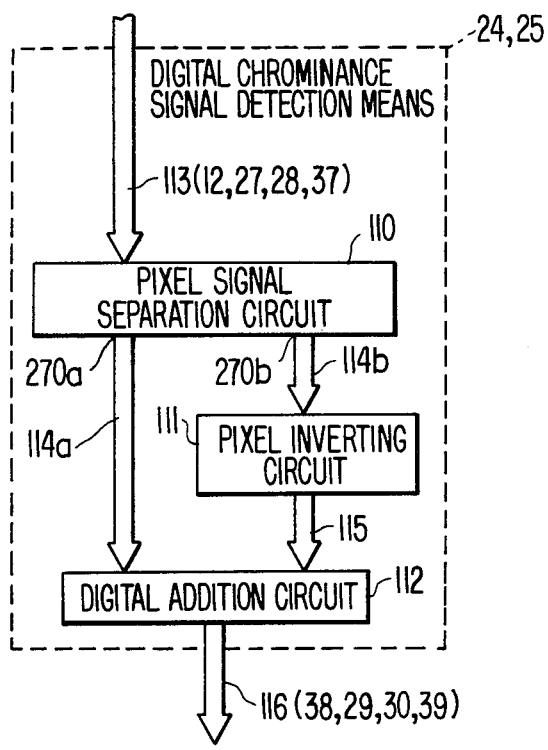
FIG. 7 is a configuration of a digital chrominance signal detection means.
Figure 8:
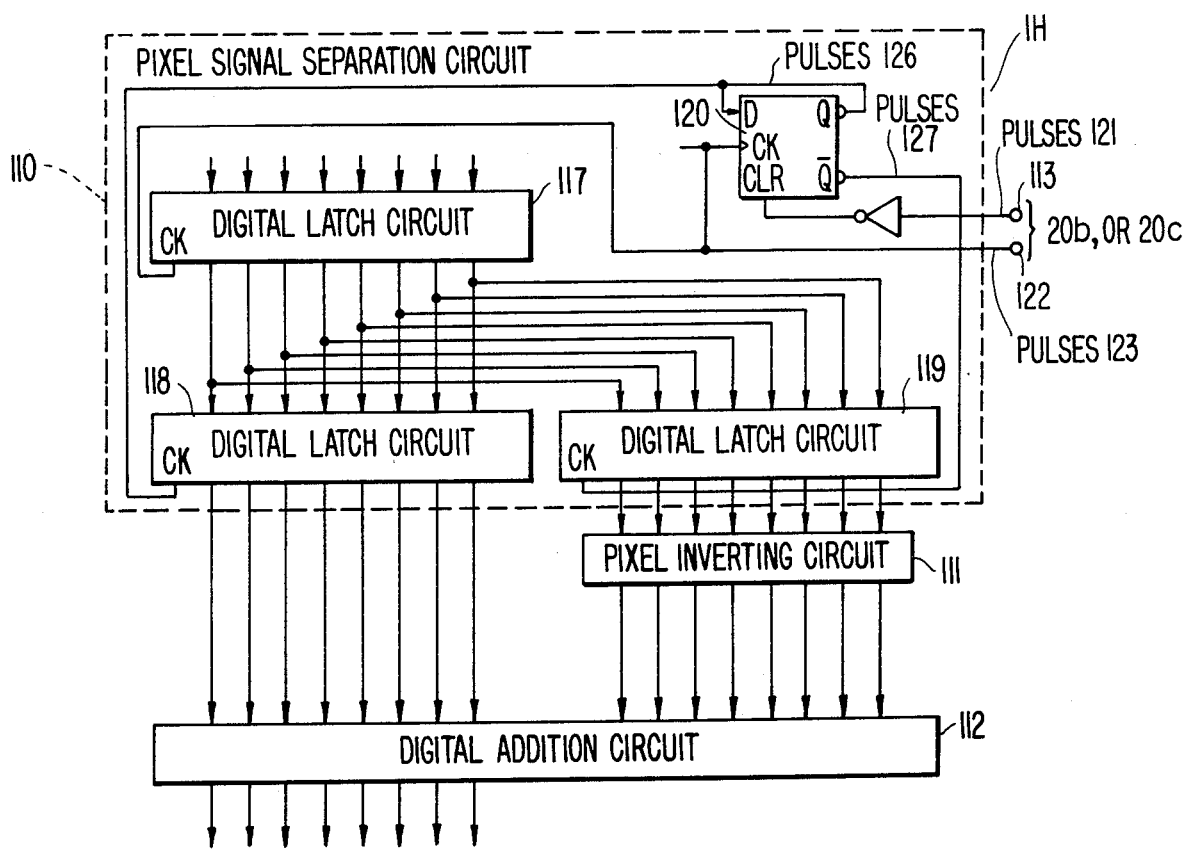
FIG. 8 is an example of a digital chrominance signal detection circuit.
Figure 9:
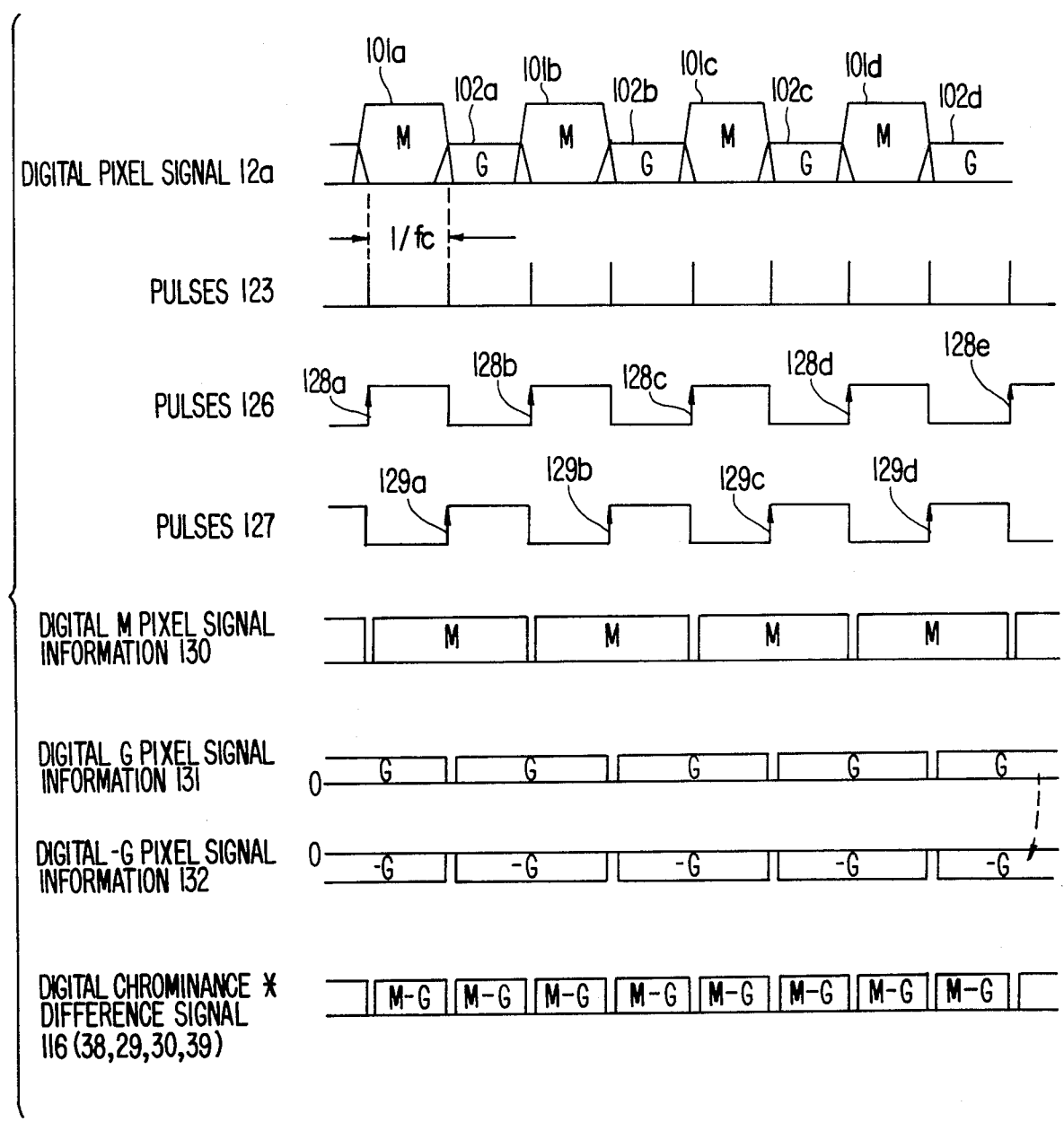
FIG. 9 shows a relation of timing pulses, input digital pixel signal, processing a multiplexed digital pixel signals and output of digital chrominance difference signals, explaining an operation of the digital chrominance signal detection circuits.

FIG. 7 shows a configuration of the digital chrominance signal detection means 24, 25. FIG. 8 shows an example of the digital chrominance detection circuit. FIG. 9 shows relations of timing pulses, input digital pixel signals, digital pixel signal on process and output of digital chrominance difference signals generated on the digital chrominance detection circuit. The detailed operation of the digital chrominance detection means will be described below for the purpose to clarify the features of this invention.

In FIG. 7, a pixel signal separation circuit 110 having first and second output terminals 270a, 270b, a pixel inverting circuit 111 and a digital addition circuit 112 are provided in the digital chrominance detection means 24, 25. The pixel signal separation circuit 110 separates the multiplexed digital pixel signal 113 into a digital pixel signal 114a and a digital pixel signal 114b. The digital pixel signal 114b is inverted to be a digital pixel signal 115 by the pixel inverting circuit 111. The digital pixel signal 114a and the digital pixel signal 115 are added for producing a digitial chrominance difference signal 116 by the digital addition circuit 112.

If the image sensing means 1 with a set of M, G, C, Y color informations are chosen as an example, it is the task of this digital chrominance detection means 24, 25 for receiving a stream of M, G, M, G or C, Y, C, Y digital pixel signals 12, 27, 28 or 37 as inputs to produce a stream of M-G, M-G, . . . or C-Y, C-Y, . . . digital chrominance difference signals 38, 29, 30 or 39, respectively. For example, the pixel signal separation circuit 110 selectively samples a stream of said multiplexed digital pixel signal 113 to obtain M digital pixel signals at the first output terminal 270a and G digital pixel signals at the second output terminal 270b. The G digital pixel signals are inverted to -G digital pixel signals. With receiving the stream of M digital pixels and the stream of -G digital pixel signals, the digital addition circuit 112 produces a stream of M-G, M-G, . . . digital chrominance difference signals. In the same manner, a stream of C-Y, C-Y, . . . digital chrominance difference signals are also produced.

In FIG. 8, a first digital latch circuit 117, a second digital latch circuit 118, a third digital latch circuit 119 and a D-flip-flop (D-FF) circuit 120 are provided in the pixel signal separation circuit 110. Digital inverting gate circuits will be provided in the inverting circuit 111. The digital input pixel signals 12, 27, 28 or 37 are latched up by the first digital latch circuit 117 at a repetition rate of $1/f_c$. The latched upon outputs of the first digital latch circuit are applied to the second and third digital latch circuits 118, 119. The second and third digital latch circuits 118, 119, are alternately latched up at a repetition rate of $2/f_c$. The timing clock pulses generated by the D-FF circuit 120 control the second and third latch circuits 118, 119. The outputs of the third digital latch circuits 119 are applied to the pixel inverting circuit 111. The outputs of the second digital latch circuit 118 and the outputs of the pixel inverting circuit 111 are supplied as inputs for the digital addition circuit 112. The detailed timing operation on the digital chrominance detection circuit shown in FIG. 8 will be described below with reference to FIG. 9.

In a horizontal synchronous interval $H_1$, with receiving digital pixel signals 12a as inputs and with receiving a stream of pulses 123 through the terminal 122, the first digital latch circuit 117 produces a stream of M pixel signals 101a–101d and G pixel signals 102a–102d as latched up outputs. At the same time, a stream of pulses 126 and a stream of pulses 127 are respectively produced through the Q output terminal and the $\bar{Q}$ output terminal of the D-FF circuit 120. As the second digital latch circuit 118 is latched on by the stream of pulses 126 during the time interval 128a–128e, a stream of M pixel signals 130 are selectively latched up at a repetition rate of $2/f_c$. In the same manner, as the third digital latch circuit 119 is latched on by the stream of pulses 127 during the time interval 129a–129e, a stream of G pixel signals 131 are selectively latched up at a repetition rate of $2/f_c$. The M pixel signals and G pixel signals are relatively shifted by a period of one pixel interval $1/f_c$. The above are basic operation of the pixel signal separation circuit 110. The G pixel signals 131 are inverted to the -G pixel signals 132 by the pixel inverting circuit 111 just after the completion of the latch up of the G pixel signals 131. Thus, with receiving the M pixel signals and -G pixel signals, the digital addition circuit 112 produces a stream of M-G digital chrominance difference signals. These signals correspond to the one of the digital chrominance difference signals 29, 30, 38 or 39.

In next horizontal synchronous interval $H_2$, as the digital pixel signals 12b with informations of C, Y, C, Y, . . . are applied to the first digital latch circuit 117 as its inputs, it is apparent that the digital addition circuit 112 produces a stream of C-Y digital chrominance difference signals by using the same operation described above on the digital pixel signals 12a.

In FIG. 8, the stream of pulses 123 supplied to the terminal 122 and 1H horizontal synchronous pulses 121 supplied to the terminal 113 correspond respectively to the sets of timing pulses 20b, 20 c. On each of the first, second and third digital latch circuits 117, 118, 119, the clock input terminal which controls latch up timing is designated by CK.

Figure 10:
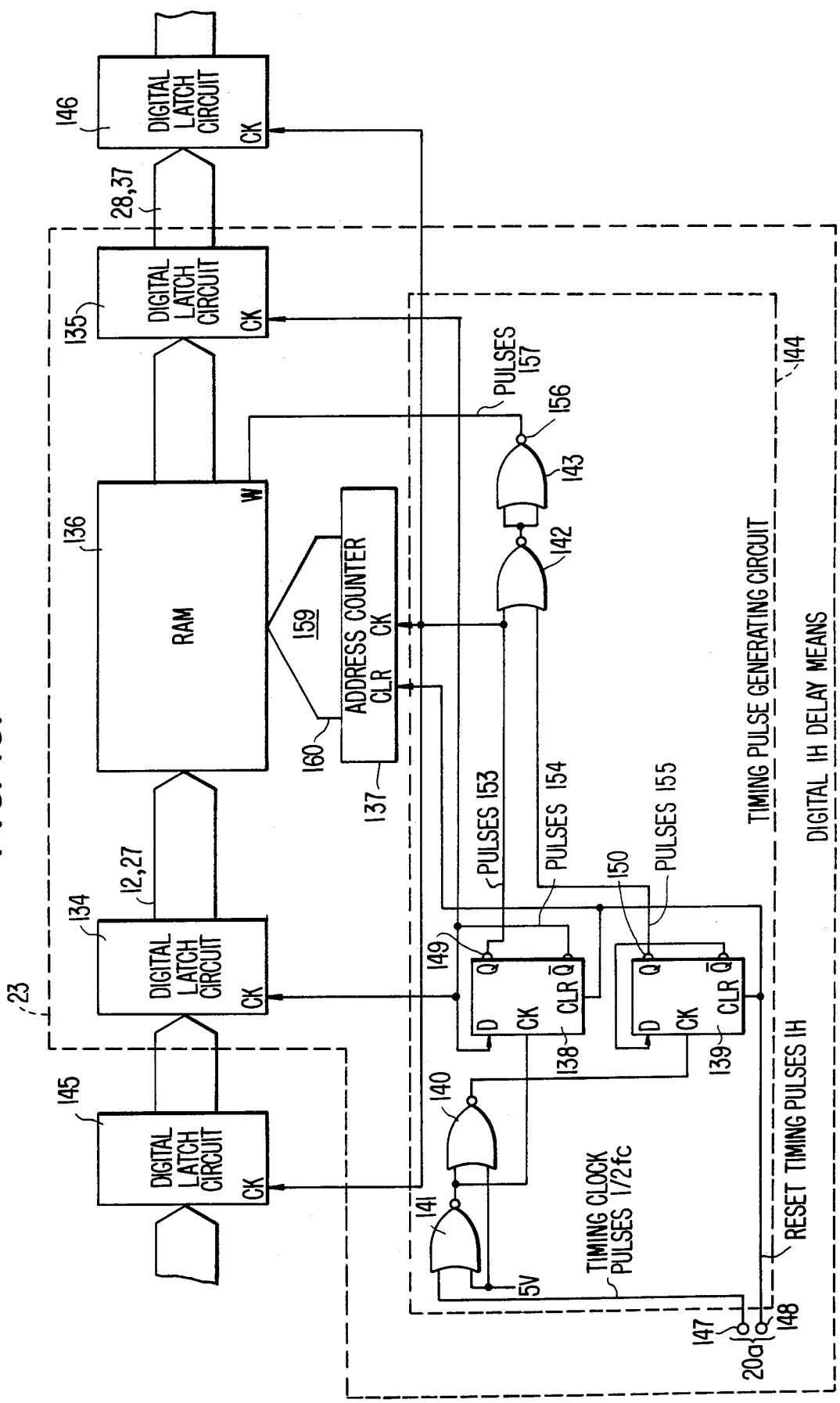
FIG. 10 is an example of a digital one horizontal synchronous period delay means.
Figure 11:
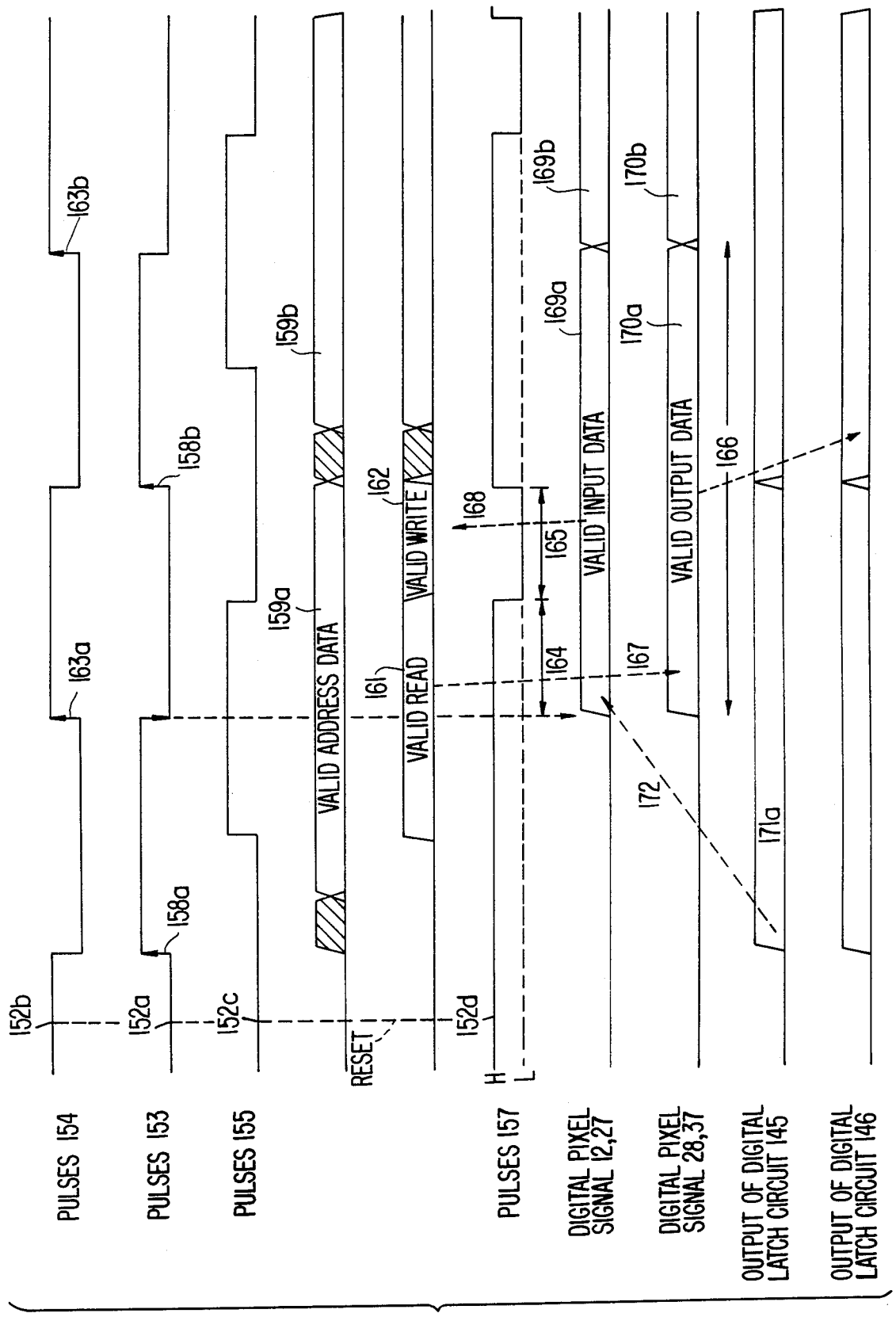
FIG. 11 shows a relation of timing pulses, input and output digital pixel signals, explaining the operation of the digital one horizontal synchronous period delay means.

FIG. 10 is an example of the digital 1H delay means 23. FIG. 11 shows a relation of timing pulses, input and output digital pixel signals. Hereinafter, the detailed operations of the digital 1H delay means 23 will be described for the purpose to clarify the features of this invention.

In FIG. 10, a second digital latch circuit 134, a third digital latch circuit 135, a random access memory (RAM) circuit 136, an address counter circuit 137 and a timing pulse generating circuit 144 are provided in the digital 1H delay means 23. Moreover, two D-flip-flop (D-FF) circuits 138, 139, four NOR circuits 140-143 are provided in the timing pulse generating circuit 144. A first and a fourth digital latch circuits 145, 146 are respectively used for an input and an output latch circuits of the digital 1H delay means 23.

In FIG. 10 and FIG. 11, with receiving timing clock pulses at a repetition rate of $1/(2f_c)$ through terminal 147 and receiving reset timing pulses at a repetition rate of one horizontal synchronous interval through a terminal 148, the first D-FF circuit 138 produces a stream of pulses 153 reset at a timing 152a through Q terminal at a repetition rate of $1/f_c$ and als produces a stream of pulses 154 reset at the timing 152b through $\overline{Q}$ terminal at a repetition rate of $1/f_c$, the second D-FF circuit 139 produces a stream of pulses 155 reset at a timing 152c through Q terminal at a repetition rate of $1/f_c$. Moreover, with receiving the stream of pulses 153 and the stream of pulses 155 respectively through the terminals 149 and 150, a combination of NOR gates 142, 143 produces a stream of pulses 157 through the terminal 156. The stream of pulses 157 are used for controling write-timing of digital picture-pixel data into the RAM circuit 136. The reset timing 152a defined above is repeated at a rate of one horizontal synchronous interval.

A detailed reading and writing operations of the RAM circuit 136 will be described below by using the stream of pulses 153, 154 and 157. First, at timing 152a, 152b, 152d a stream of pulses 153, 154, 157 are respectively reset, and at the same time the address counter circuit 137 is also reset. Then, at the timing 158a the address counter circuit 137 defines the first valid address data 159a. As these address data 159a are applied to an address control circuit located inside the RAM circuit 136 through a parallel data bus 160, the RAM circuit 136 produces valid read-out data 161 by sensing H level logic on the stream of the pulses 157 and accepts valid write-in data 162 by sensing L level logic on the stream of the pulses 157. In accordance with the above operation, at the timing 153a, the second digital latch circuit 134 is latched up and connected to input terminals of the RAM circuit 136. During a time interval 164 in which a latch up interval 166 for valid output data and an interval for valid read-out data 161 are overlapped, the valid data 161 are stored into the first address of the RAM circuit 136 just before one horizontal synchronous interval are transferred into the third digital latch circuit 135 as shown by arrow 167 and holded as output data 170a.

In the same manner as described above, the second digital latch circuit 134 is latched up at the same timing, and input pixel data 171a stored in the first digital latch circuit 145 are shifted into the second digital latch circuit 134 as shown by arrow 172 and stored as valid input data 169a. Then, during a time interval 165 in which a latch up interval 166 for valid input data 169a and an interval for valid write data 162 are overlapped, the valid input data 169a are stored into the first address of the RAM circuit 136 as shown by arrow 168. The new written-in data 162 are continuously stored into the first address until the first address is accessed again in the next coming horizontal synchronous interval.

With making the same analogous considerations described above, it is apparent that at a timing 158b the address counter circuit 137 sets a second address data 159b, and at a timing 163b valid output data 170b are produced in the third digital latch circuit 135, and a valid input data 169b are stored into the second address of the RAM circuit 136. In this way, by receiving the address information increased one by one the RAM circuit 136 stores digital pixel signals 12, 27 as valid input data and produces valid output data as digital pixel signals 28, 37 delayed by a period of one horizontal synchronous interval.

In FIG. 10 the first digital latch circuit 145 and the fourth digital latch circuit 146 are operated by the stream of pulses 153. Hence, the function of the fourth digital latch circuit 146 is identical with the function of the first digital latch circuit 117 shown in FIG. 8. In the case of the invention shown in FIG. 2, the function of the first digital latch circuit 145 is assumed as a digital buffer latch circuit connected between the digital white balance means 22 and the digital 1H delay means 23. In another example of this invention shown in FIG. 3, the function of the first digital latch circuit 145 is assumed as a digital buffer latch circuit connected between the A/D converting means and the digital 1H delay means 23.

As an example of memory size for the RAM circuit 136, it becomes approximately 400×N bits with the case of the clock frequency of 7.2 MHz, in which the N bits denotes the width of data shifted in parallel. Although the timing pulse generating circuit 144 comprises the two D-FFs 138, 139 and the four NOR circuits 140-143 as shown in FIG. 10, it is apparent that the means should not be recognized as an only means for realizing the timing pulse generating circuit 144. The timing clock pulses with a repetition rate of $1/(2f_c)$ supplied through the terminal 147 and the reset timing pulses with a repetition rate of one horizontal synchronous interval supplied through the terminal 148 correspond to the set of timing pulses 20a shown in FIGS. 2 and 3.

Figure 12:
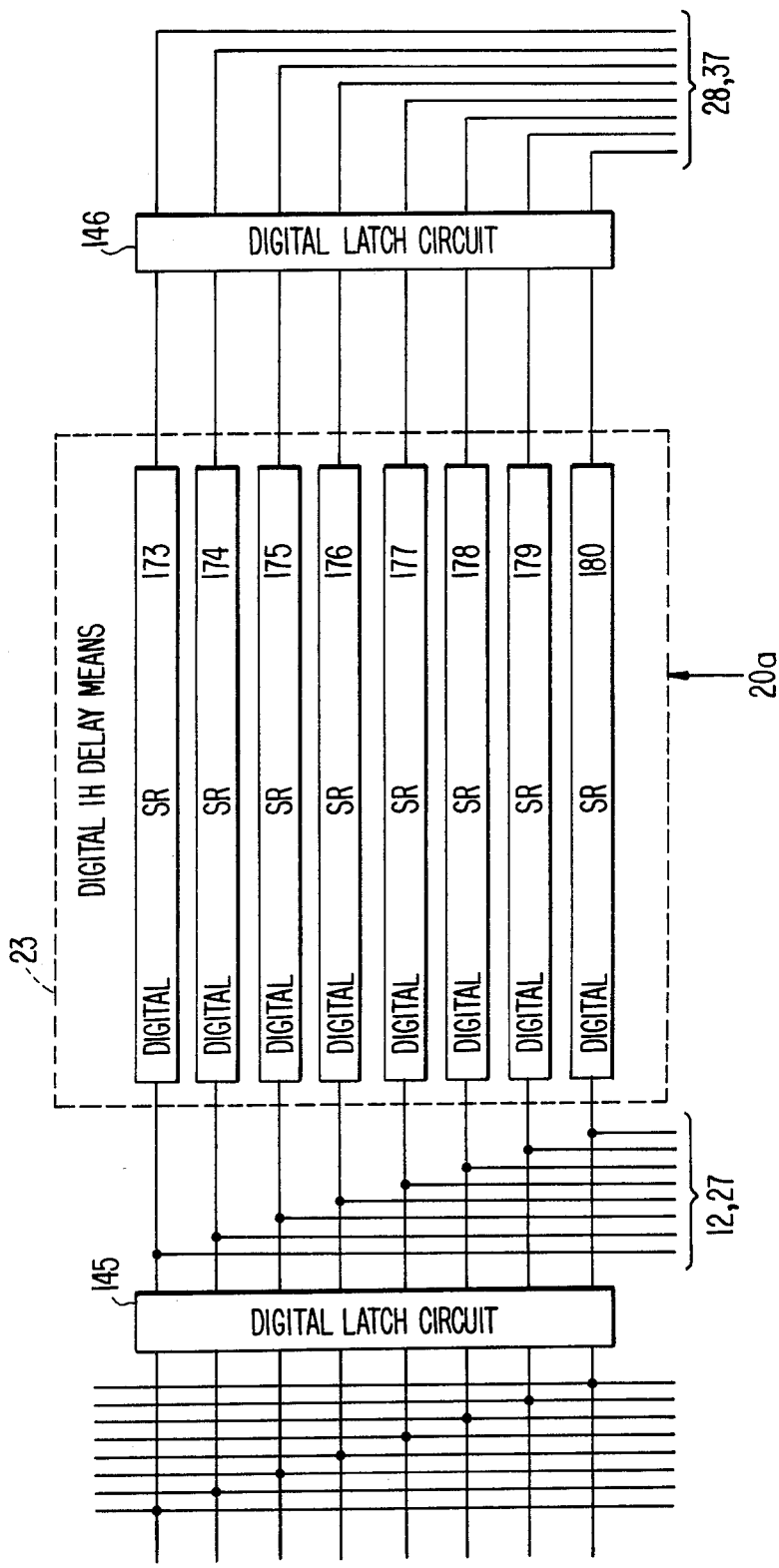
FIG. 12 is another example of the digital one horizontal synchronous period delay means.

FIG. 12 is another example of the digital 1H delay means 23 which is composed of parallel digital shift register with M stages×N bits sizes. Later on, N bits is assumed to 8 bits parallel data. The relative equation between one horizontal synchronous interval and frequency of color burst sub carrier, $f_b=3.58$ MHz is defined as:

$$1H = (455/2) \times (1/f_b) \tag{1}$$

If it is assumed that the parallel 8-bit shift registers 173-180 are operated at the clock frequency of $f_c$, the number of the stages M is defined as:

$$M = (455/2) \times (f_c/f_b) \tag{2}$$

Therefore, if the clock frequency $f_c$ is chosen to be 7.2 MHz, which is two times $f_b$, M becomes 455 bits. If the clock frequency $f_c$ is chosen to 14.4 MHz, which is four times $f_b$, M becomes 910 bits. In this way, if $f_c$ is chosen to be integer times $f_b$, the value of M becomes also integer number. This means that it is possible to realize actual working parallel shift registers 173-180. In FIG. 12, the parallel 8-bit shift registers 173-180 are clocked by common clocking pulses. These clocking pulses correspond to the timing pulse system 20a. The purpose of the digital latch circuits 145, 146 shown in FIG. 12 are identical with the first and the fourth digital latch circuits shown in FIG. 10. As described above with reference to FIG. 12, it is apparent that the digital 1H delay means 23 comprises parallel shift registers with size of M stages by N bits.

Figure 13:
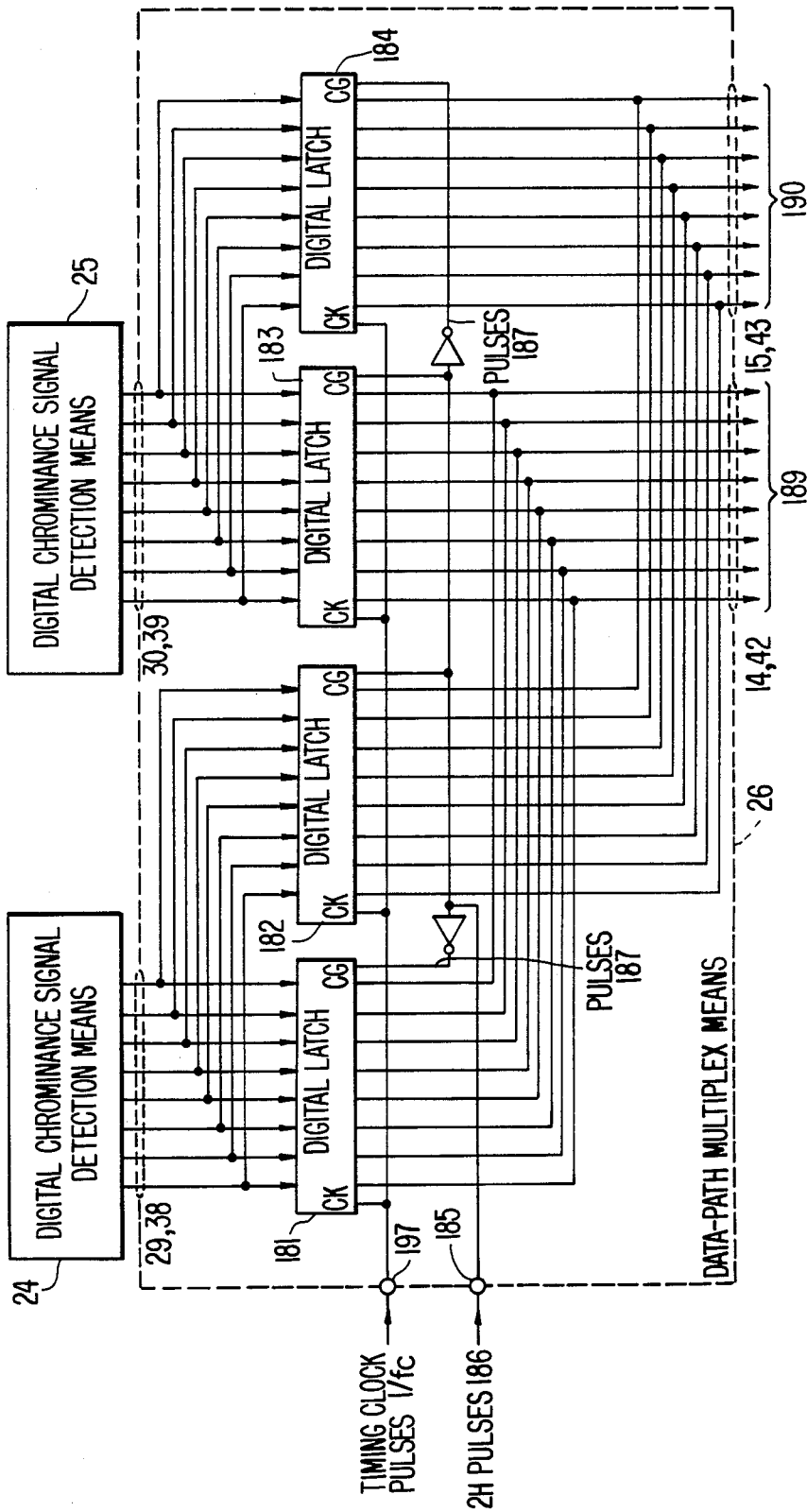
FIG. 13 is an example of a data-path multiplex means.

FIG. 13 is an example of the data-path multiplex means 26. A first digital latch circuit 181, a second digital latch circuit 182, a third digital latch circuit 183 and a fourth digital latch circuit 184 are provided in the data-path multiplex means 26, in which: inputs of the first digital latch circuit 181 and the second digital latch circuit 182 are connected in common; inputs of the third digital latch circuit 183 and the fourth digital latch circuit 184 are also connected in common; outputs of the first and third digital latch circuits 181, 183 are connected in common; outputs of the second and fourth digital latch circuits 182, 184 are also connected in common; and control gate timing for the first and fourth digital latch circuits 181, 184 are connected to be reverse phased to that for the second and third digital latch circuits 182, 183, at a repetition rate of two horizontal synchronous intervals 2H.

Figure 14:
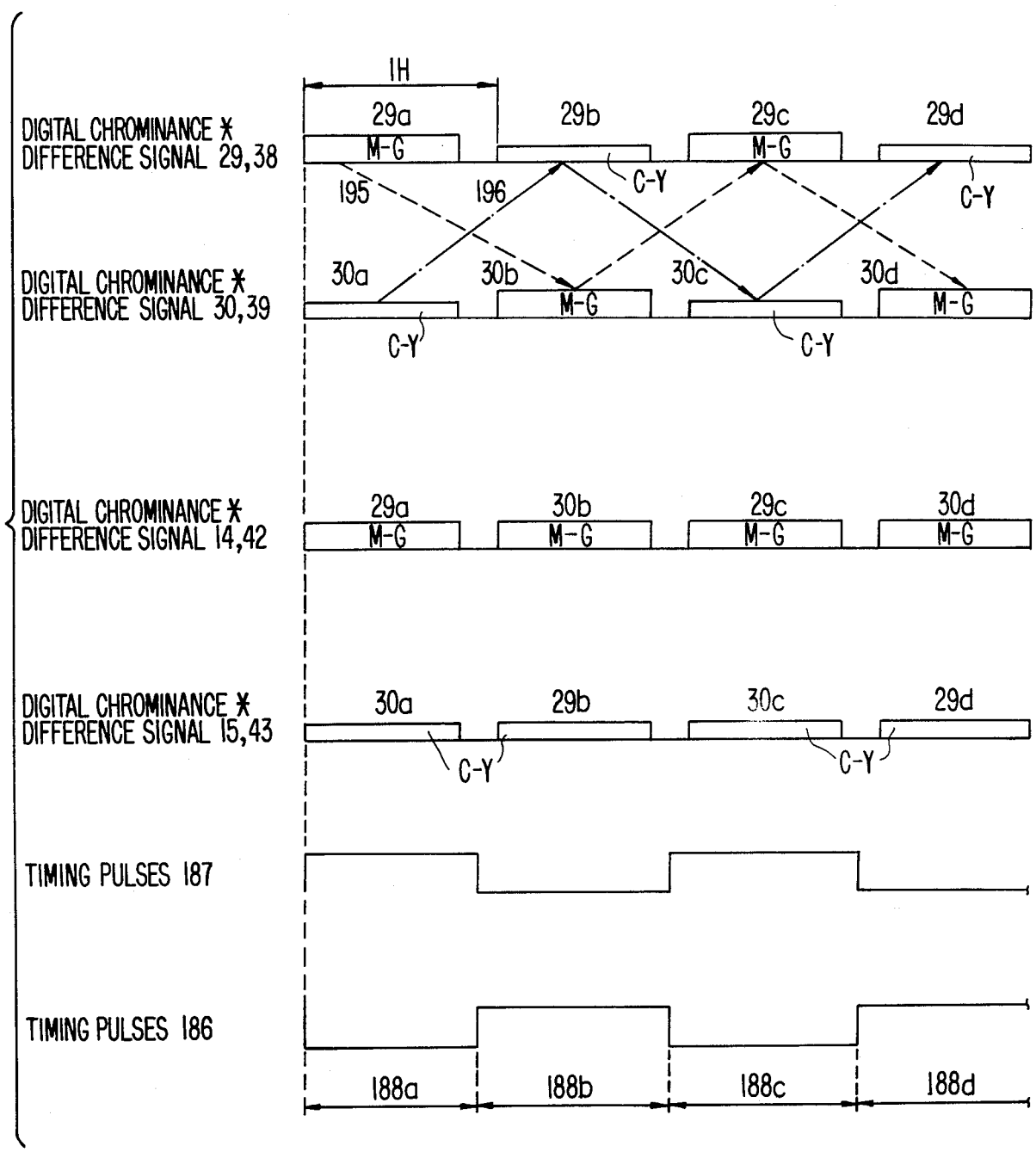
FIG. 14 shows a relation of timing pulses and processing digital chrominance difference signals, explaining the operation of the data-path multiplex means.

FIG. 14 shows relations of the digital chrominance difference signals 29, 30, produced respectively at the outputs of the digital chrominance signal detection means 24, 25, and the digital chrominance difference signals 14, 15, produced at the outputs of the data-path multiplex means 26. The detailed operation of this data-path multiplex means 26 will be described below to clarify the features of this inventions.

As shown in FIG. 14, the relations between the digital chrominance difference signal 29 and the digital chrominance difference signal 30 are alternately phase shifted by one horizontal synchronous interval H, and both digital chrominance difference signals 29, 30 are composed of a stream of either M-G or C-Y chrominance difference signals repeated at a rate of two horizontal synchronous interval 2H. Therefore, it is the task of the data-path multiplex means 26 for receiving these uncontinuous M-G, C-Y, M-G, C-Y signals 29, 30 as inputs to produce two independent and continuous stream of M-G chrominance difference signals 14 and C-Y chrominance difference signals 15. The digital chrominance difference signals 29 and the digital chrominance difference signals 30 are respectively supplied to the common inputs of the first and second digital latch circuits 181, 182 and the common inputs of the third and fourth digital latch circuits 183, 184. Besides, a stream of pulses 186 with a repetition rate of the 2H are supplied to a terminal 185. Then, during the horizontal synchronous interval 188a the first digital latch circuit 181 becomes to be conductive with receiving the stream of timing pulse 187 through CG terminal, and the third digital latch circuit 183 becomes to be non-conductive with receiving the stream of timing pulses 186 through CG terminal. So, informations of the digital M-G chrominance difference signals 29a are produced through the common output 189 of the first and third digital latch circuits 181, 183. Similarly, during the same interval 188a the second latch circuit 182 becomes to be non-conductive with receiving the stream of pulses 186 through CG terminal and the fourth digital latch circuit 184 becomes to be conductive with receiving the stream of pulses 187 through CG terminal. So, informations of digital C-Y chrominance difference signals 30a are produced through the common output 190 of the second and fourth digital latch circuits 182, 184. By using the same manner described above, it is apparent that during the next horizontal synchronous interval 188b, the first and fourth digital latch circuits 181, 184 become to be non-conductive, the second and third digital latch circuits 182, 183 become to be conductive. So, the informations of the digital M-G chrominance signals 30b are produced through the common outputs 189 of the first and third digital latch circuits 181, 183, and the informations of the digital C-Y chrominance difference signals 29b are produced through the common outputs 190 of the second and fourth digital latch circuits 182, 184. In this way, it becomes that informations of digital M-G chrominance difference signals 29a, 30b, 29c, 30d, —are selected by the manner shown by broken lines 195 and are produced as the digital chrominance difference signals 14 through the common outputs 189. It also becomes that informations of digital C-Y chrominance difference signals 30a, 29b, 30c, 29d, —are selected by the manner shown by dot-and-line 196 and are produced as the digital chrominance difference signals 15 through the common outputs 190.

It is additionally mentioned that the first to fourth digital latch circuits 181-184 receive clock pulses with a repetition rate of $1/f_c$ through the terminal 197 in accordance with the operating timing for the digital chrominance signal detection means 24, 25, and that the stream of pulses 186 supplied through the terminal 185 at a repetition rate of 2H and clock pulses supplied through the terminal 197 at a repetition rate of $1/f_c$ correspond to the set of timing pulses 20d.

In FIG. 14, if the digital chrominance difference signals 29 and 30 are replaced with the digital chrominance difference signals 38 and 39, the digital chrominance difference signals 14, 15 are replaced with the digital chrominance difference signals 42 and 43. These situations correspond to the case for a data-path multiplex means 26 shown in FIG. 3. The actual configurations for this means 26 is exactly same as the one shown in FIG. 13.

As an example of the image sensing means 1 shown in FIG. 4, a combination of M, G, C, Y color filters is chosen. The reason comes from the fact that the sum of M picture-pixel signal and G pixel signal: M+G and the sum of C pixel signal and Y pixel signal: C+Y are equal to luminance signal $y_l$. That is, $$y_l = M + G \quad (3)$$

$$y_l = C + Y \quad (4).$$

In other words the sensitivity of the M, G, C, Y color filters are chosen to fulfill the conditions defined by equations (3) and (4). Therefore, it is the basic task for the digital luminance process circuit 31 for receiving the stream of M, G, M, G pixel signals or C, Y, C, Y pixel signals to produce streams of M+G, M+G, M+G, ... or C+Y, C+Y, C+Y, ... signals, which are digital luminance signals $y_l$.

In general, sensitivities of any four kinds of $\alpha$, $\beta$, $\gamma$ and $\delta$ color filters to any colors $\alpha$, $\beta$, $\gamma$ and $\delta$ may be selected so as to satisfy the following conditions:

$$y_l = \alpha + \beta$$

$$y_l = \gamma + \delta$$

Figure 15:
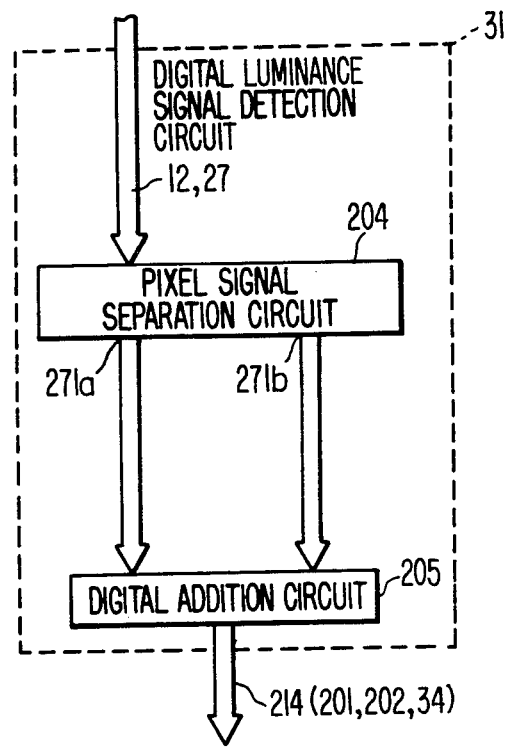
FIG. 15 is a configuration of a digital luminance signal detection circuit.

An example of this digital luminance signal detection circuit 31 is shown in FIG. 15. In FIG. 15, a pixel signal separation circuit 204 having first and second output terminals 271a and 271b, a digital addition circuit 205 are provided in the digital luminance signal detection circuit 31, in which the functions of the pixel signal separation circuit 204 and the digital addition circuit 205 are respectively identical with the pixel signal separation circuit 101 and the digital addition circuit 112 used for the digital chrominance signal detection means 24, 25. Therefore, it is the task of the pixel signal separation circuit 204 for receiving the stream of M, G, M, G pixel or C, Y, C, Y pixel signals to produce M or C pixel signals and G or Y pixel signals respectively at the first and second output terminals 271a and 271b. The digital addition circuit 205 produces digital luminance signal of M+G, M+G, ... or C+Y, C+Y, ... with receiving the selectively separated M or C pixel signals and the separated G or Y pixel signals.

Figure 16:
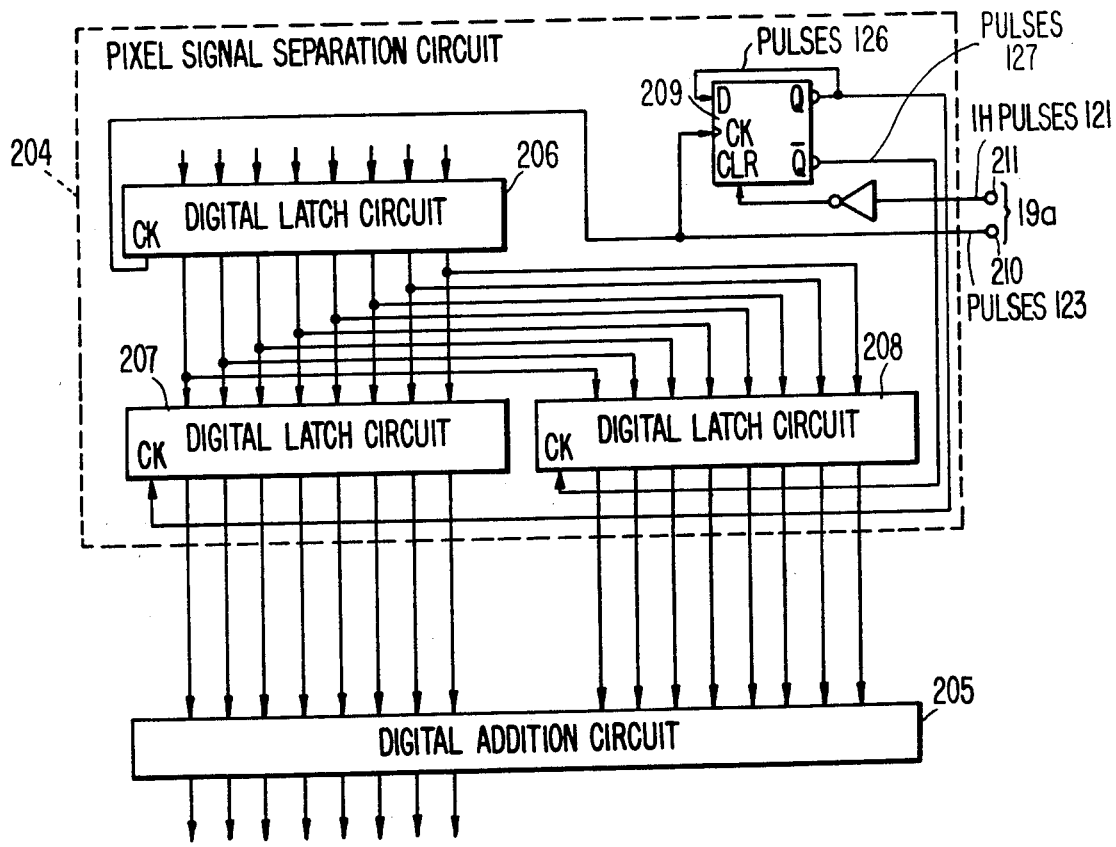
FIG. 16 is an example of a digital luminance signal detection circuit.
Figure 17:
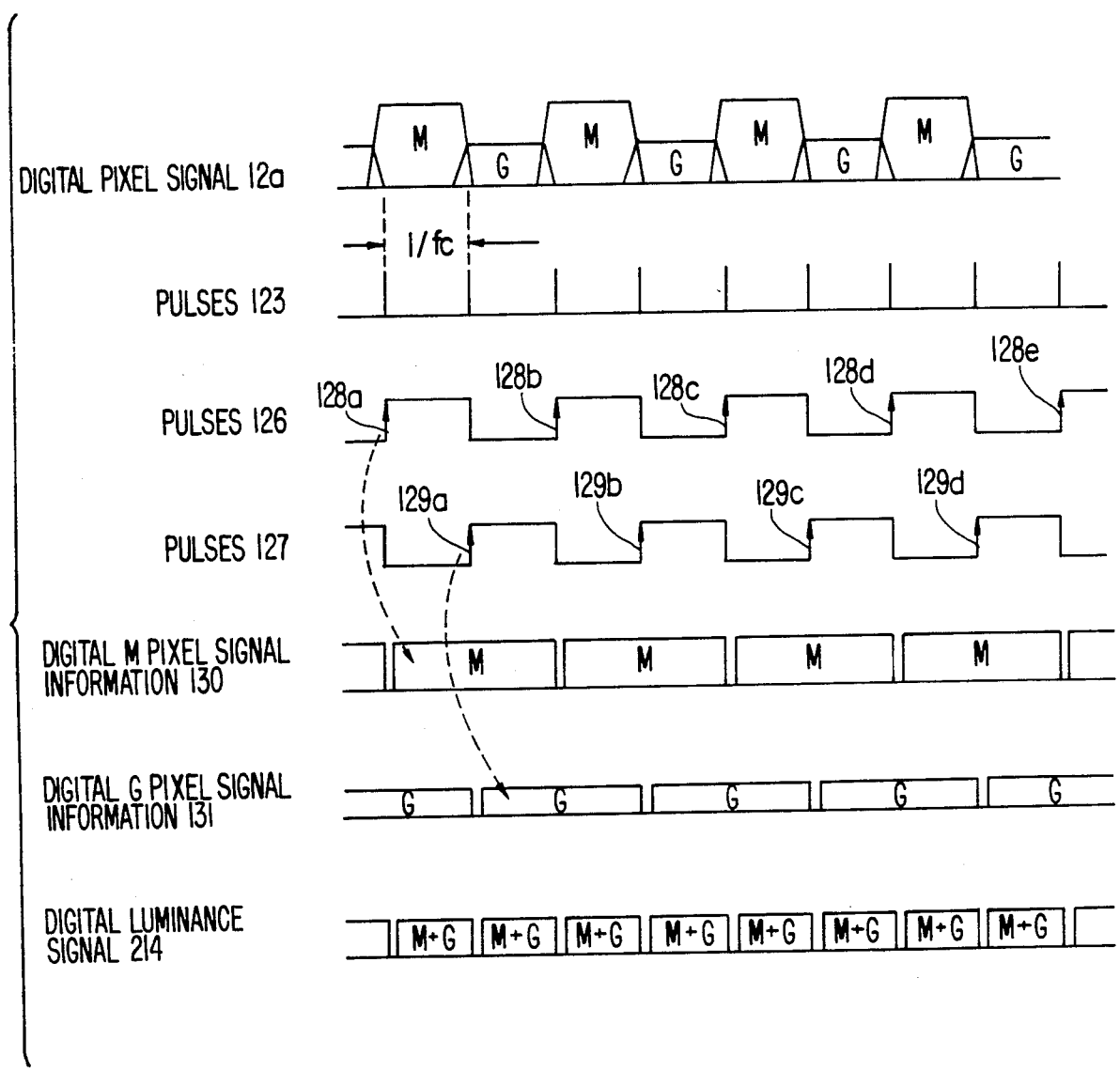
FIG. 17 shows a relation of timing pulses, input digital pixel signal, processing a multiplexed digital pixel signal and output of a digital luminance signal, explaining the operation of the digital luminance signal detection circuit.

FIG. 16 shows an example of an actual circuit for the digital luminance signal detection circuit 31. FIG. 17 shows relations of timing pulses, input digital pixel signals, digital pixel signals on ways of the process and digital luminance signals. Comparing FIG. 16 with FIG. 8, it is apparent that circuit configuration without the digital pixel inverting circuit 111 shown in FIG. 8 is identical with the circuit configuration shown in FIG. 16. Therefore, the operating function of a first digital latch circuit 206, a second digital latch circuit 207, a third digital latch circuit 208 and a D-flip-flop (D-FF) circuit 209 are respectively the same as the first digital latch circuit 117, the second digital latch circuit 118, the third digital latch circuit 119 and the D-FF circuit 120. Thus, with receiving a stream of pulses 123 at a repetition rate of $1/f_c$ through the terminal 210, the D-FF circuit 209 produces a stream of pulses 126 and a stream of pulses 127 respectively at terminal Q and terminal $\bar{Q}$. With receiving the digital pixel signals 12a as input signals through the first digital latch circuit 206, the second digital latch circuit 207 produces selectively M pixel signals at a repetition rate of $2/f_c$, and the third digital latch circuits 208 produces selectively G pixel signals at a repetition rate of $2/f_c$. The selectively latched up M pixel signals 130 are phase shifted to the selectively latched up G pixel signals 131 by a period of one pixel interval $1/f_c$. In this way, the stream of the M pixel signals 130 and G pixel signals 131 are combined into a stream of M+G, M+G, M+G digital luminance signals 214 by the aid of the digital addition circuit 205. Now it is apparent that with receiving the digital pixel signals 12b the digital luminance signal detection circuit 31 is able to produce a stream of C+Y, C+Y, C+Y digital luminance signals. Horizontal synchronous pulses 121 with a repetition rate of 1H are supplied to terminal 211 for resetting the pixel signal separation circuit 204. This stream of pulses 121b and the stream of pulses 123 correspond to the set of timing pulses 19a.

Figure 18:
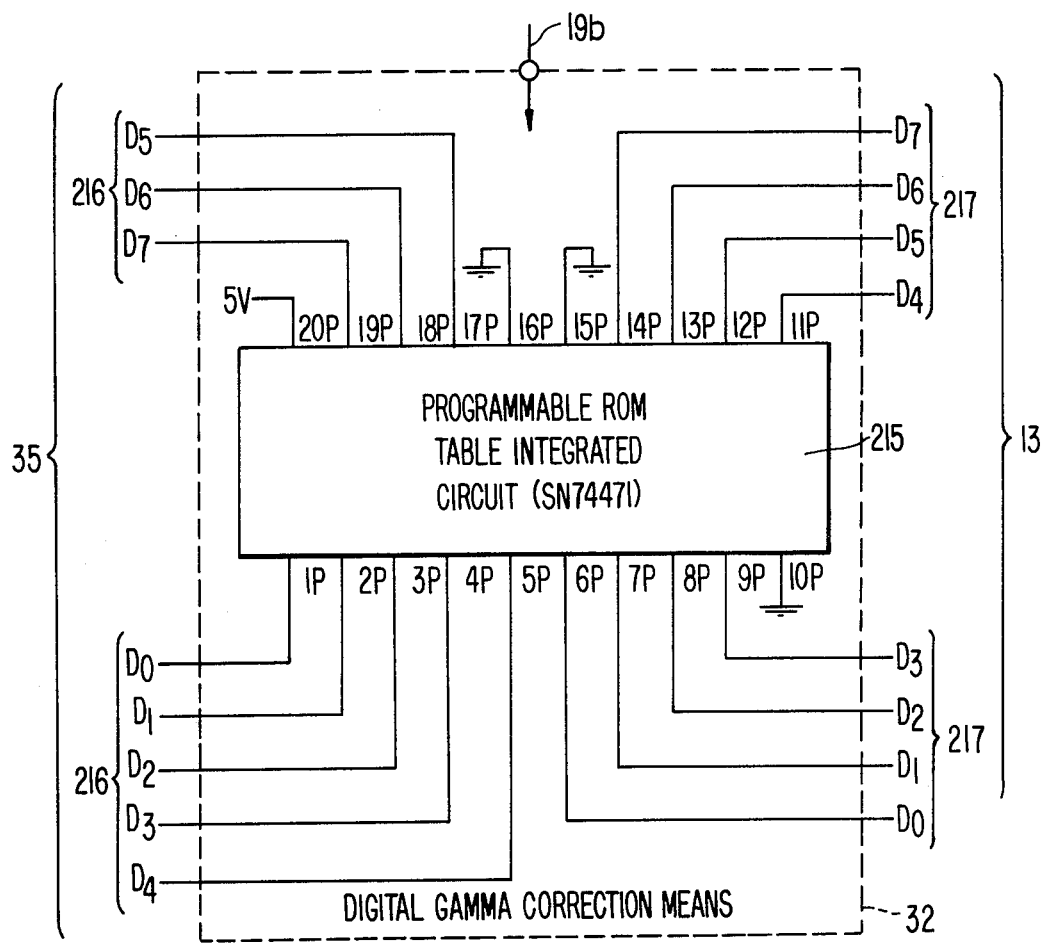
FIG. 18 is an example of a digital gamma correction circuit.
Figure 19:
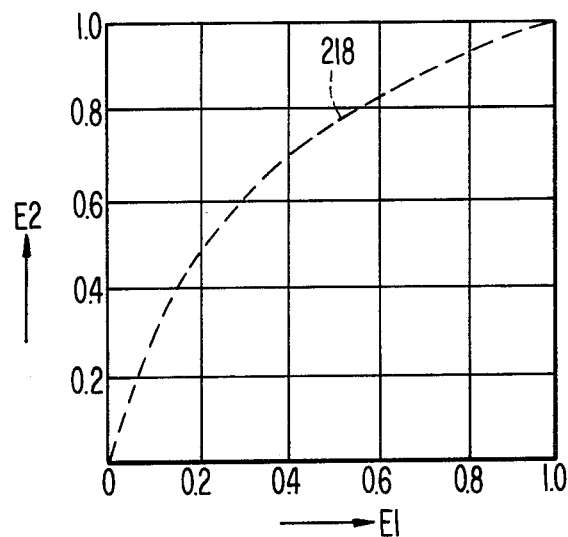
FIG. 19 shows a characteristic curve of the digital gamma correction circuit.

FIG. 18 is an example of the digital gamma correction circuit 32, in which a programmable read only memory (ROM) circuit 215 (such as SN74471) is used. The example shows the case of 8-bit parallel input and output. With receiving 8 bits digital luminance signals 35 through terminal 216, the ROM circuit 215 produces digital luminance signals 36 at terminal 217. An example of the gamma corrected curve 218 is shown in FIG. 19, where E1 and E2 denote respectively analog converted value of 8-bit parallel input and 8-bit parallel output. It is apparent that the part of the ROM circuit 215 may be replaced with a random access memory (RAM). By using a RAM the characteristic curve 218 can be arbitrarily programmed in accordance with electrical informations 19b of a requested gamma value.

Figure 20:
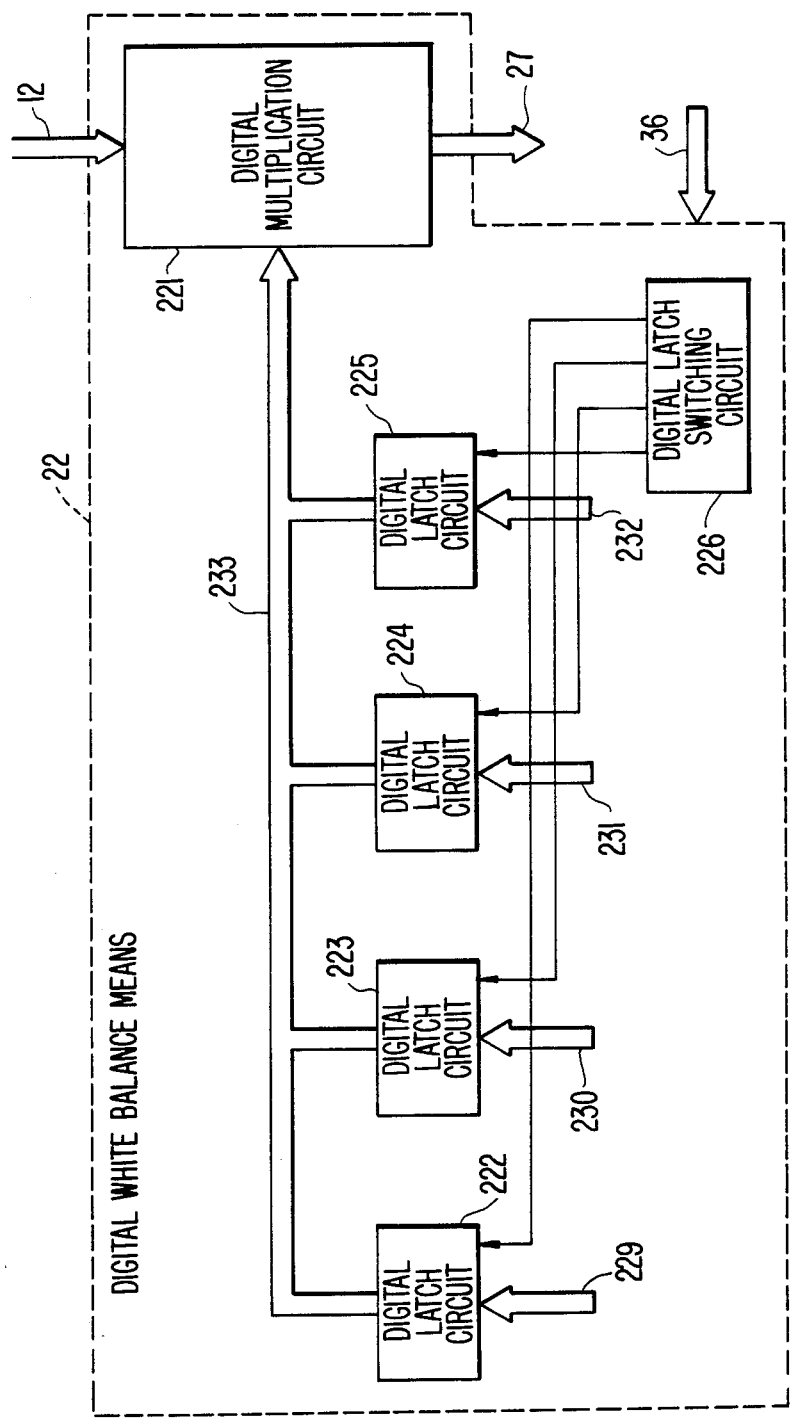
FIG. 20 is an example of a digital white balance circuit which is introduced in the case of the first color camera shown in FIG. 2.

FIG. 20 is an example of the digital white balance means 22 shown in FIG. 2. A digital multiplication circuit 221, first to fourth digital latch circuits 222-225, a digital switch circuit 226 are provided in the digital white balance means 22, in which four outputs of the first to fourth digital latch circuits 222-225 are connected in common with a common bus 233 and are used as an input terminal for the digital multiplication circuit 221. The digital switch circuit 226 controls latch up timing of the first to fourth digital latch circuits 222-225.

Figure 21:
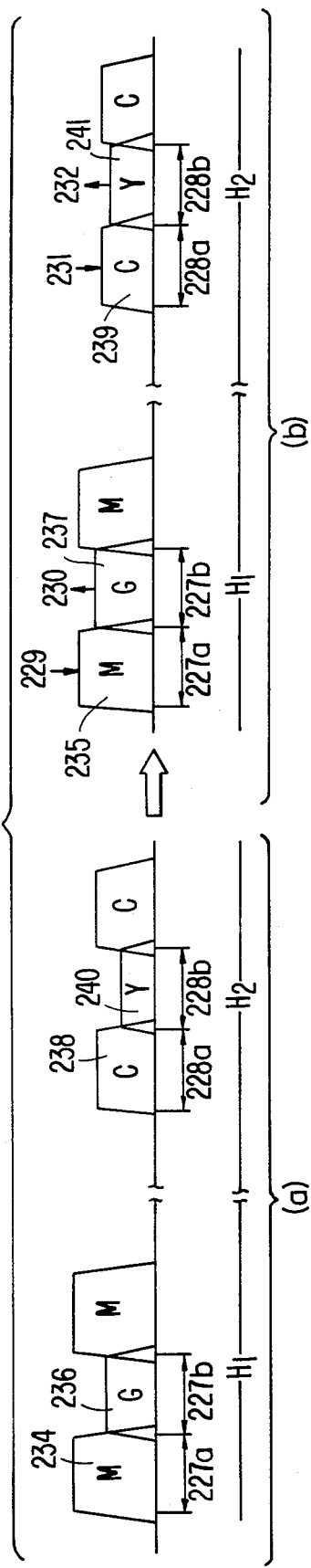
FIGS. 21(a), (b) show the basic operation of the circuit shown in FIG. 20.

FIG. 21(a) shows an example of partially expanded waveform for the pixel signal 12 in horizontal synchronous intervals $H_1$ and $H_2$. In the horizontal synchronous interval $H_1$, the digital pixel signal 12 is composed of M, G, M, G informations. At timing 227a the digital switch circuit 226 latches up the first digital latch circuit 222, and the first digital latch circuit 222 transfer a multiplier value 229 used for M pixel signal into the common bus 233. Therefore, a multiplication between the digital M pixel signal 234 and the multiplier value 229 is performed by the digital multiplication circuit 221. The calculated result is recognized as a digital M pixel signal 235 corrected by the multiplier value 229. In the same manner, at timing 227b the digital switch circuit 226 latches up the second digital latch circuit 223, and the second latch circuit 223 transfer a multiplier value 230 into the common bus 233. Therefore, a multiplication between G pixel signal 236 and the multiplier value 237 is performed by the digital multiplication circuit 221. The result is recognized as a digital G pixel signals 237 corrected by multiplier value 230. In this way, during the horizontal synchronous interval $H_1$, the digital pixel signal 12 with informations of M, G, M, G is converted into the digital pixel signal 27 with the informations of M, G, M, G in accordance with the latch up timing for the first and second digital latch circuits 222, 223.

In the next horizontal synchronous interval $H_2$, the digital pixel signal 12 is composed of C, Y, C, Y informations. At timing 228a the digital switch circuit 226 latches up the third digital latch circuit 224, and the third digital latch circuit 224 transfers a multiplier value 231 into the common bus 233. Therefore, a multiplication between the digital C pixel signal 238 and the multiplier value 231 is performed by the digital multiplier circuits 221. The calculated result is recognized as a digital C pixel signal 239 corrected by multiplier value 231. In the same manner, at timing 228b the digital switch circuit 226 latches up the fourth digital latch circuit 225, and the fourth digital latch circuit 225 transfers a multiplier value 232 into the common bus 233. Therefore, a multiplication between the digital Y pixel signal 240 and the multiplier value 232 is performed by the digital multiplication circuit 221. The calculated result is recognized as a digital Y pixel signal 241 corrected with the multiplier value 232. Thus, during the horizontal synchronous interval $H_2$, the digital pixel signal 12 with informations of C, Y, C, Y is converted into digital pixel signal 27 with informations of C, Y, C, Y.

As a summary of the above descriptions, it is apparent that the digital pixel signal 12 can be converted into the digital pixel signal 27 with getting multiplications of the multiplier values 229, 230, 231 and 232 in accordance with the latch up timing of the first to fourth digital latch circuits 222, 223, 224 and 225.

In FIG. 20 and FIG. 2, the set of timing pulses 36 given by the driving means 6 control the digital switch circuit 226 with getting timing informations of M, G, C, Y digital pixel signals, clock pulses with a repetition rate of $1/f_c$ and horizontal synchronous intervals.

Figure 22:
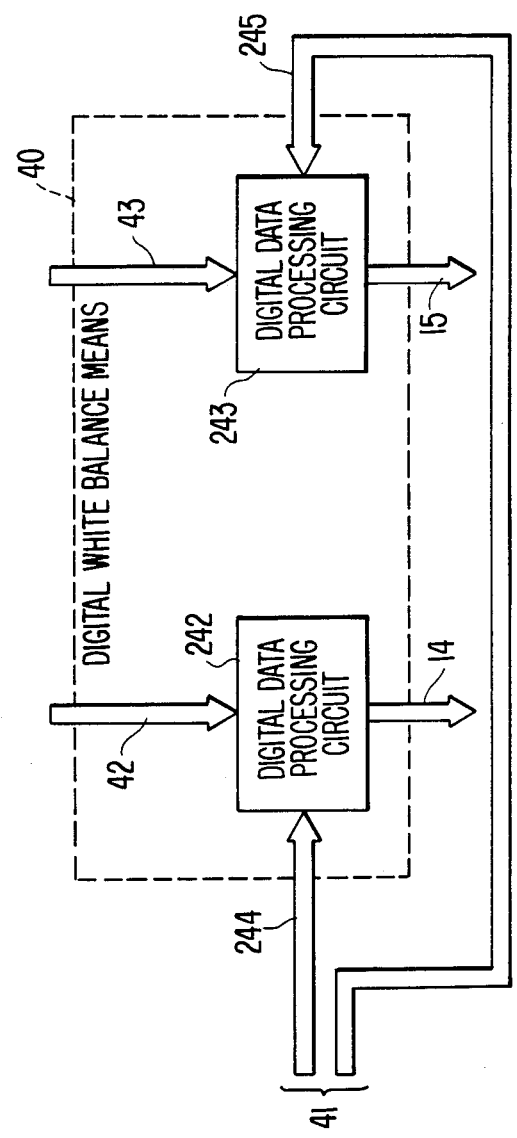
FIG. 22 is an example of a digital white balance circuit which is introduced in the case of the second color camera shown in FIG. 3.
Figures 23A, 23B, 24:
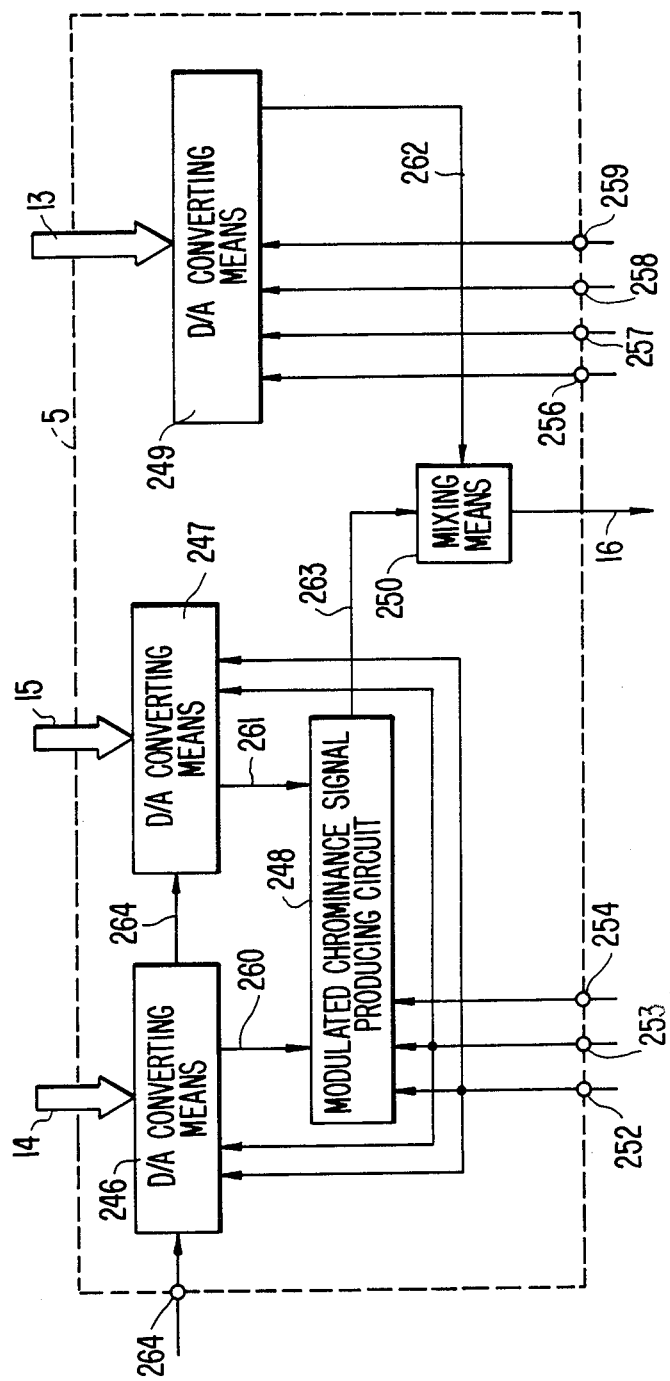
FIGS. 23(a), (b) show the basic operation of the circuit shown in FIG. 22.
FIG. 24 is an example of the specific configuration of a color television signal encoding means.

FIG. 22 is an example of the digital white balance means 40 shown in FIG. 3. A first and a second digital data processing circuits 242, 243 are provided in the digital white balance means 40, in which digital correction data 244, 245 are respectively supplied to the first and second data processing digital circuits 242, 243. The data-path multiplex means 26 shown in FIG. 3 produces the digital chrominance difference signals 42, 43 as shown in FIG. 23(a). The digital chrominance difference signals 42 are composed of M-G, M-G, ... signals repeated at a rate of $1/f_c$ and continued during each horizontal synchronous interval. The digital chrominance difference signal 43 is composed of C-Y, C-Y, ... signals repeated at a rate of $1/f_c$ and continued during each horizontal synchronous interval.

With receiving the digital chrominance difference signal 42 and the digital correction data 244 as inputs, the digital data processing circuit 242 adds the digital correction data 244 with positive or negative values to the digital chrominance difference signal 42. As the result of this data processing, the digital chrominance difference signal 14 is produced. With receiving the digital chrominance difference signal 43 and digital correction data 245 as inputs, the digital data processing circuit 243 adds the digital correction data 245 with positive or negative values to the digital chrominance difference signal 43. As the result of this data processing, the digital chrominance difference signal 15 is produced. In this way, the digital chrominance difference signals 42 and 43 are respectively converted to two digital chrominance difference signals 14 and 15 by getting relatively independent values of digital correction data 244 and 245. So, it is basically possible to realize the digital chrominance difference signals 14, 15 with white balanced conditions. In FIG. 3, the set of timing pulses 41 supplied to the digital white balance means 40 corresponds to the digital correction data 244 and 245. These data can be defined with a evaluation of the chrominance difference signals 14, 15 themselves. An actually detailed method how to define the data is realized by using a microcomputer. The above described operations of the digital white balance means 40 are illustrated in FIGS. 23(a), (b).

FIG. 24 is an example of a specific configuration for the color television encoding means 5 shown in FIGS. 1-3. The color television signal encoding means 5 comprises: a first digital to analog signal (D/A) converting means 246 coupled to the digital chrominance signal processing means 4 for receiving the digital chrominance difference signal 14 to produce a first analog chrominance difference signal 260; a second digital to analog signal (D/A) converting means 247 coupled to the digital chrominance signal processing means 4 for receiving the digital chrominance difference signal 15 to produce a second analog chrominance difference signal 261; a third digital to analog signal (D/A) converting means 249 coupled to the digital luminance signal processing means 3 for receiving the digital luminance signal 13 to produce an analog luminance signal 262; a modulated chrominance signal producing means 248 coupled to the first and second D/A converting means 246, 247 for receiving the first and second analog chrominance difference signals 260, 261 to produce a modulated analog chrominance signal 263; and a mixing means 250 coupled to the third D/A converting means 249 and the modulated chrominance signal producing means 248 for receiving the analog luminance signal 262 and the modulated analog chrominance signal 263 to produce the color television signal 16. Conditions of the set of pulses 21 for driving the color television encoding means 5 are as follows: Pulses clocking with a repetition rate of $1/f_c$ are supplied to the first and second D/A converting means 246, 247 through a terminal 264. Timing pulses with vertical and horizontal blanking intervals and timing pulses with burst flag interval are supplied to the first and second D/A converting means 246, 247 and the modulated chrominance signal producing means 248 through a terminal 252 and a terminal 253. Burst carrier pulses with a frequency of 3.58 MHz (for NTSC case) are supplied to the modulated chrominance signal producing means 248 through a terminal 254. Standard bias signal for clipping black and white level, timing pulses with vertical and horizontal blanking intervals, timing pulses with vertical and horizontal synchronous and clocking pulses with a repitition rate of $1/f_c$ are respectively supplied to the third D/A converting means 249 through terminals 256, 257, 258, 259. This means that functions for generating timing intervals of the standard television signals are included in the third D/A converting means 249. In this way an example of the color television encoding means 5 are realized.

Although the preferred embodiments of the present invention are described hereinbefore, it should be understood that they are only for the purpose of explanation of the invention, and that various modifications and changes are possible within the scope of the present invention clearly described in the following claims.

What is claimed is:

1. A color camera comprising:
   image sensing means for receiving optical signals to produce two alternately different pixel signals—a first pixel signal and a second pixel signal, the first pixel signal being composed of two different α and β color pixel signals which are shifted out at a repetition frequency of $f_c$ in one of two consecutive horizontal synchronous intervals of a television signal, and the second pixel signal being composed of two different γ and δ color pixel signals which are different from the α and β color pixel signals in the first pixel signal and which are shifted out at a repetition frequency of $f_c$ in the other of said two consecutive horizontal synchronous intervals of the television signal;
   analog to digital (A/D) converting means for receiving said two alternately different pixel signals to produce a multiplexed digital pixel signal;
   digital chrominance signal processing means for receiving said multiplexed digital pixel signal to produce two independent digital chrominance difference signals;
   digital luminance signal processing means for receiving said multiplexed digital pixel signal to produce a digital luminance signal;
   color television signal encoding means for receiving said two independent digital chrominance difference signals and said digital luminance signal to produce a color television signal;
   control circuit means for generating first, second and third sets of timing pulses which are for respectively controlling said A/D converting means, said digital chrominance signal processing means and said digital luminance signal processing means; and
   driving means for driving said image sensing means, said color television signal encoding means and said control circuit means, wherein said digital chrominance signal processing means comprises: digital one horizontal synchronous period (1H) delay means; first digital chrominance signal detection means; second digital chrominance signal detection means; and data-path multiplex means, said multiplexed digital pixel signal being applied to said first digital chrominance signal detection means and said digital 1H delay means, output signals from said digital 1H delay means being applied to said second digital chrominance signal detection means, and output signals from said first and second digital chrominance signal detection means being applied to said data-path multiplex means.

2. The color camera according to claim 1, wherein said image sensing means has an optical color filter comprising rows of color filter elements which is placed on a sensing surface of said sensing means and has filter elements of four different colors $\alpha$, $\beta$, $\gamma$, $\delta$, alternate rows of said filter having said color filter elements arranged in the order $\alpha$, $\beta$, $\alpha$, $\beta$, ... and $\gamma$, $\delta$, $\gamma$, $\delta$, ..., respectively.

3. The color camera according to claim 1, wherein said A/D converting means comprises: an analog switch circuit coupled to said image sensing means for receiving said $\alpha$ or $\gamma$ color pixel signal at a first input and said $\beta$ or $\delta$ color pixel signal at a second input to produce a multiplexed stream of analog pixel signals at an output; and an analog to digital (A/D) converting circuit coupled to said output of said analog switch circuit for receiving said multiplexed stream of analog pixel signals to produce said multiplexed digital pixel signal, said analog switch being switched alternately between said first and second inputs at a repetition frequency of $f_c/2$, and said A/D converting circuit being operated at a frequency of $f_c$ which is synchronized with said frequency of $f_c/2$.

4. The color camera according to claim 1, wherein said A/D converting means comprises: a first analog to digital (A/D) converting circuit coupled to said image sensing means for receiving said $\alpha$ or $\gamma$ color pixel signal to produce a digital $\alpha$ or $\gamma$ color pixel signal; a second analog to digital (A/D) converting circuit coupled to said image sensing means for receiving said $\beta$ or $\delta$ color pixel signal to produce a digital $\beta$ or $\delta$ color pixel signal; a first digital latch circuit coupled to said first A/D converting circuit for receiving said digital $\alpha$ or $\gamma$ color pixel signal; and a second digital latch circuit coupled to said second A/D converting circuit for receiving said digital $\beta$ or $\delta$ color pixel signal, outputs of said first and second digital latch circuits being coupled to each other, and an operating timing of said first A/D converting circuit and said first digital latch circuit and an operating timing of said second A/D converting circuit and said second digital latch circuit being alternately synchronized to produce said multiplexed digital pixel signal.

5. The color camera according to claim 1, wherein said digital luminance signal processing means comprises: a digital luminance processing circuit coupled to said A/D converting means for receiving said multiplexed digital pixel signal to produce a digital luminance signal; and a digital gamma correction circuit coupled to said digital luminance processing circuit for receiving said digital luminance signal from said digital luminance processing circuit to produce a gamma-corrected digital luminance signal.

6. The color camera according to claim 1, wherein said color television signal encoding means comprises: first digital to analog (D/A) signal converting means coupled to said digital chrominance signal processing means for receiving one of said two independent digital chrominance difference signals to produce a first analog chrominance difference signal; second digital to analog (D/A) signal converting means coupled to said digital chrominance signal processing means for receiving the other of said two independent digital chrominance difference signals to produce a second analog chrominance difference signal; third digital to analog (D/A) signal converting means coupled to said digital luminance signal processing means for receiving said digital luminance signal to produce an analog luminance signal; modulated chrominance signal producing means coupled to said first and second D/A converting means for receiving said first and second analog chrominance difference signals to produce a modulated analog chrominance signal; and mixing means coupled to said third D/A converting means and said modulated chrominance signal producing means for receiving said analog luminance signal and said modulated analog chrominance signal to produce said color television signal.

7. A color camera comprising:
image sensing means for receiving optical signals to produce two alternately different pixel signals—a first pixel signal and a second pixel signal, the first pixel signal being composed of two different $\alpha$ and $\beta$ color pixel signals which are shifted out at a repetition frequency of $f_c$ in one of two consecutive horizontal synchronous intervals of a television signal, and the second pixel signal being composed of two different $\gamma$ and $\delta$ color pixel signals which are different from the $\alpha$ and $\beta$ color pixel signals in the first pixel signal and which are shifted out at a repetition frequency of $f_c$ in the other of said two consecutive horizontal synchronous intervals of the television signal;
analog to digital (A/D) converting means for receiving said two alternately different pixel signals to produce a multiplexed digital pixel signal;
digital chrominance signal processing means for receiving said multiplexed digital pixel signal to produce two independent digital chrominance difference signals;
digital luminance signal processing means for receiving said multiplexed digital pixel signal to produce a digital luminance signal;
color television signal encoding means for receiving said two independent digital chrominance difference signals and said digital luminance signal to produce a color television signal;
control circuit means for generating first, second and third sets of timing pulses which are for respectively controlling said A/D converting means, said digital chrominance signal processing means and said digital luminance signal processing means; and
driving means for driving said image sensing means, said color television signal encoding means and said control circuit means,
wherein said digital chrominance signal processing means comprises: digital one horizontal synchronous period (1H) delay means which receives the output signal of said A/D converting means; first digital chrominance signal detection means which receives the output signal of said A/D converting means; second digital chrominance signal detection means which receives the output signal of said digital 1H delay means; data-path multiplex means which receives the output signals of said first and second digital chrominance signal detection means and obtains therefrom first and second digital chrominance difference signals; and digital white balance means which is inserted into a signal transmission path from said A/D converting means to a common input of said first digital chrominance signal detection means and said digital 1H delay means or in two signal transmission paths from said data-path multiplex means to said color television signal encoding means.

8. The color camera according to claim 7, wherein said image sensing means has an optical color filter comprising rows of color filter elements which is placed on a sensing surface of said sensing means and has filter elements of different colors—magenta (M), green (G), cyan (C) and yellow (Y), corresponding to said $\alpha$, $\beta$, $\gamma$ and $\delta$ colors respectively, said color filter elements being arranged in first orders of M, G, M, G, ... in a horizontal sensing direction and in second orders of C, Y, C, Y, ... in said horizontal sensing direction, said first and second orders being arranged alternately in a vertical sensing direction.

9. The color camera according to claim 7, wherein said digital luminance signal processing means comprises: a digital luminance signal detection circuit which receives said multiplexed digital pixel signal from said A/D converting means; and digital gamma correction means which performs gamma correction of an output signal of said digital luminance signal detection circuit.

10. The color camera according to claim 9, wherein said digital luminance signal detection circuit comprises: a pixel signal separation circuit for separating said multiplexed digital pixel signal into a digital $\alpha$ or $\gamma$ color pixel signal and a digital $\beta$ or $\delta$ color pixel signal; and a digital addition circuit for adding the digital $\alpha$ or $\gamma$ color pixel signal and the digital $\beta$ or $\delta$ color pixel signal.

11. The color camera according to claim 10, wherein said pixel signal separation circuit comprises: a first digital latch circuit operating at the frequency of $f_c$ for latching said multiplexed digital pixel signal; a second digital latch circuit operating at a frequency of $f_c/2$ for latching the digital $\alpha$ or $\gamma$ color pixel signal latched by said first digital latch circuit; and a third digital latch circuit operating at the frequency of $f_c/2$ delayed by $1/f_c$ relative to the operating timing of said second digital latch circuit for latching the digital $\beta$ or $\delta$ color pixel signal latched by said first digital latch circuit, output signals of said second and third digital latch circuits being applied to said digital addition circuit.

12. The color camera according to claim 7, wherein said digital white balance means is inserted into the signal transmission path from said A/D converting means to the common input of said first digital chrominance signal detection means and said digital 1H delay means, and comprises: first, second, third and fourth digital latch circuits which respectively receive externally provided white balance multiplier data; a digital latch switching circuit for sequentially activating said first through fourth digital latch circuits at the frequency of $f_c$; and a digital multiplication circuit which respectively multiplies digital $\alpha$, $\beta$, $\gamma$ and $\delta$ color pixel signals of said multiplexed digital signal from said A/D converting means with said white balance multiplier data which is outputted sequentially from said first through fourth digital latch circuits.

13. The color camera according to claim 7, wherein said digital white balance means is inserted into the signal transmission paths from said data-path multiplex means to said color television signal encoding means, and comprises first and second digital data processing circuits each of which adds externally provided digital correction data to one of said two independent digital chrominance difference signals from said data-path multiplex means.

14. The color camera according to claim 7, wherein said first and second digital chrominance signal detection means each comprises: a pixel signal separation circuit for separating said multiplexed digital pixel signal into a digital $\alpha$ or $\gamma$ color pixel signal and a digital $\beta$ or $\delta$ color pixel signal so as to provide two output digital pixel signals; a pixel inverting circuit for inverting one of the two output digital pixel signals of said pixel signal separation circuit; and a digital addition circuit for adding the other of said two output digital pixel signals of said pixel signal separation circuit with an output digital pixel signal of said pixel inverting circuit.

15. The color camera according to claim 14, wherein said pixel signal separation circuit comprises: a first digital latch circuit operating at the frequency of $f_c$ for latching said multiplexed digital pixel signal; a second digital latch circuit operating at a frequency of $f_c/2$ for latching the digital $\alpha$ or $\gamma$ color pixel signal latched by said first digital latch circuit; and a third digital latch circuit operating at the frequency of $f_c/2$ delayed by $1/f_c$ relative to the operating timing of said second digital latch circuit for latching the digital $\beta$ or $\delta$ color pixel signal latched by said first digital latch circuit, an output signal of said second digital latch circuit being directly applied to said digital addition circuit, and an output signal of said third digital latch circuit being applied to said digital addition circuit through said pixel inverting circuit.

16. The color camera according to claim 7, wherein said digital 1H delay means comprises: a random access memory circuit; a plurality of digital latch circuits connected as an input-and-output interface for said random access memory circuit; an address counter circuit for generating read and write addresses for accessing said random access memory; and a timing pulse generating circuit for controlling said address counter circuit.

17. The color camera according to claim 7, wherein said digital 1H delay means comprises a plurality of digital shift registers.

18. The color camera according to claim 7, wherein said data-path multiplex means comprises: first and second digital latch circuits which receive the output signal of said first digital chrominance signal detection means; and third and fourth digital latch circuits which receive the output signal of said second digital chrominance signal detection means, the outputs of said first and third digital latch circuits being connected in common and the outputs of said second and fourth digital latch circuits being connected in common, and output gates of said first and fourth digital latch circuits and output gates of said second and third digital latch circuits being opened alternately in synchronization with a horizontal synchronizing signal of the television signal.

* * * * *